United States Patent
Tillin et al.

(10) Patent No.: US 8,262,271 B2
(45) Date of Patent: Sep. 11, 2012

(54) DISPLAY

(75) Inventors: Martin David Tillin, Oxford (GB); Jonathan Mather, Oxford (GB); Emma Jayne Walton, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 394 days.

(21) Appl. No.: 12/502,317

(22) Filed: Jul. 14, 2009

(65) Prior Publication Data

US 2010/0014313 A1 Jan. 21, 2010

(30) Foreign Application Priority Data

Jul. 17, 2008 (GB) .................................. 0813088.2

(51) Int. Cl.
*F21V 5/00* (2006.01)
*G02F 1/1335* (2006.01)
*G02B 27/22* (2006.01)

(52) U.S. Cl. .......... 362/606; 362/268; 362/331; 349/15; 359/463

(58) Field of Classification Search .................. 362/606, 362/626, 629, 327, 268, 331; 349/57, 95, 349/15; 359/619, 463; 345/32; 348/59
See application file for complete search history.

(56) References Cited

U.S. PATENT DOCUMENTS

| | | | |
|---|---|---|---|
| RE27,617 E | 4/1973 | Olsen | |
| 5,204,160 A | 4/1993 | Rouser | |
| 5,392,140 A * | 2/1995 | Ezra et al. ....................... | 349/15 |
| 5,396,350 A | 3/1995 | Beeson et al. | |
| 5,528,319 A | 6/1996 | Austin | |
| 5,581,379 A * | 12/1996 | Aoyama et al. .................... | 349/5 |
| 5,598,281 A * | 1/1997 | Zimmerman et al. ............. | 349/5 |
| 5,731,857 A * | 3/1998 | Neijzen ........................... | 349/95 |
| 6,424,786 B1* | 7/2002 | Beeson et al. ................ | 385/146 |
| 6,628,353 B2* | 9/2003 | Nakamura ....................... | 349/95 |
| 6,697,042 B1* | 2/2004 | Cohen et al. ................... | 345/102 |
| 6,703,989 B1* | 3/2004 | Harrold et al. ................... | 345/32 |
| 6,762,883 B2 | 7/2004 | Yoshida et al. | |
| 6,859,240 B1* | 2/2005 | Brown et al. .................... | 349/15 |
| 6,876,408 B2 | 4/2005 | Yamaguchi | |
| 7,121,709 B2* | 10/2006 | Shinohara et al. ............ | 362/606 |

(Continued)

FOREIGN PATENT DOCUMENTS

EP 0 599 451 6/1994

(Continued)

OTHER PUBLICATIONS

British Search Report for corresponding Application No. GB 0813088.2 dated Nov. 10, 2008.

*Primary Examiner* — Peggy A. Neils
(74) *Attorney, Agent, or Firm* — Renner, Otto, Boisselle & Sklar, LLP

(57) ABSTRACT

A display comprises: a single-view image display panel (6); and a parallax optic (8) disposed over a display face of the image display panel for restricting the angular spread of light output from the display face of the image display panel. This enables light to be concentrated in a desired viewing angle range (66), and avoids a user (56) seeing unwanted reflections that may occur as a result of a greater viewing angle range (64) if the parallax optic (8) is not provided. The display may be used, as an example, in a motor vehicle to prevent unwanted reflections from the windscreen (62) of the vehicle.

36 Claims, 22 Drawing Sheets

U.S. PATENT DOCUMENTS

| | | | | |
|---|---|---|---|---|
| 7,154,674 | B2 * | 12/2006 | Nellissen | 359/619 |
| 7,215,475 | B2 * | 5/2007 | Woodgate et al. | 359/624 |
| 7,236,286 | B2 | 6/2007 | Clikeman et al. | |
| 7,325,943 | B2 * | 2/2008 | Benoit et al. | 362/247 |
| 7,420,742 | B2 * | 9/2008 | Wood et al. | 359/619 |
| 7,428,027 | B2 * | 9/2008 | Takayama | 349/95 |
| 7,597,467 | B2 * | 10/2009 | Itaya | 362/601 |
| 7,641,374 | B2 * | 1/2010 | Chen et al. | 362/609 |
| 7,675,681 | B2 * | 3/2010 | Tomikawa et al. | 359/619 |
| 7,679,809 | B2 * | 3/2010 | Tonar et al. | 359/267 |
| 7,679,828 | B2 * | 3/2010 | Munro | 359/627 |
| 2001/0012078 | A1 * | 8/2001 | Hira et al. | 349/95 |
| 2002/0158967 | A1 | 10/2002 | Janick et al. | |
| 2003/0161040 | A1 * | 8/2003 | Ishii et al. | 359/463 |
| 2004/0012734 | A1 * | 1/2004 | Yamanaka et al. | 349/95 |
| 2006/0245060 | A1 | 11/2006 | Goto | |
| 2007/0058127 | A1 | 3/2007 | Mather et al. | |
| 2007/0058258 | A1 | 3/2007 | Mather et al. | |
| 2007/0076406 | A1 | 4/2007 | Kodama et al. | |

FOREIGN PATENT DOCUMENTS

| | | |
|---|---|---|
| GB | 2 426 352 | 11/2006 |
| JP | 2004-245918 | 9/2004 |
| JP | 2007-333867 | 12/2007 |
| WO | 2005/071474 | 8/2005 |

* cited by examiner

CONVENTIONAL ART

F I G. 2
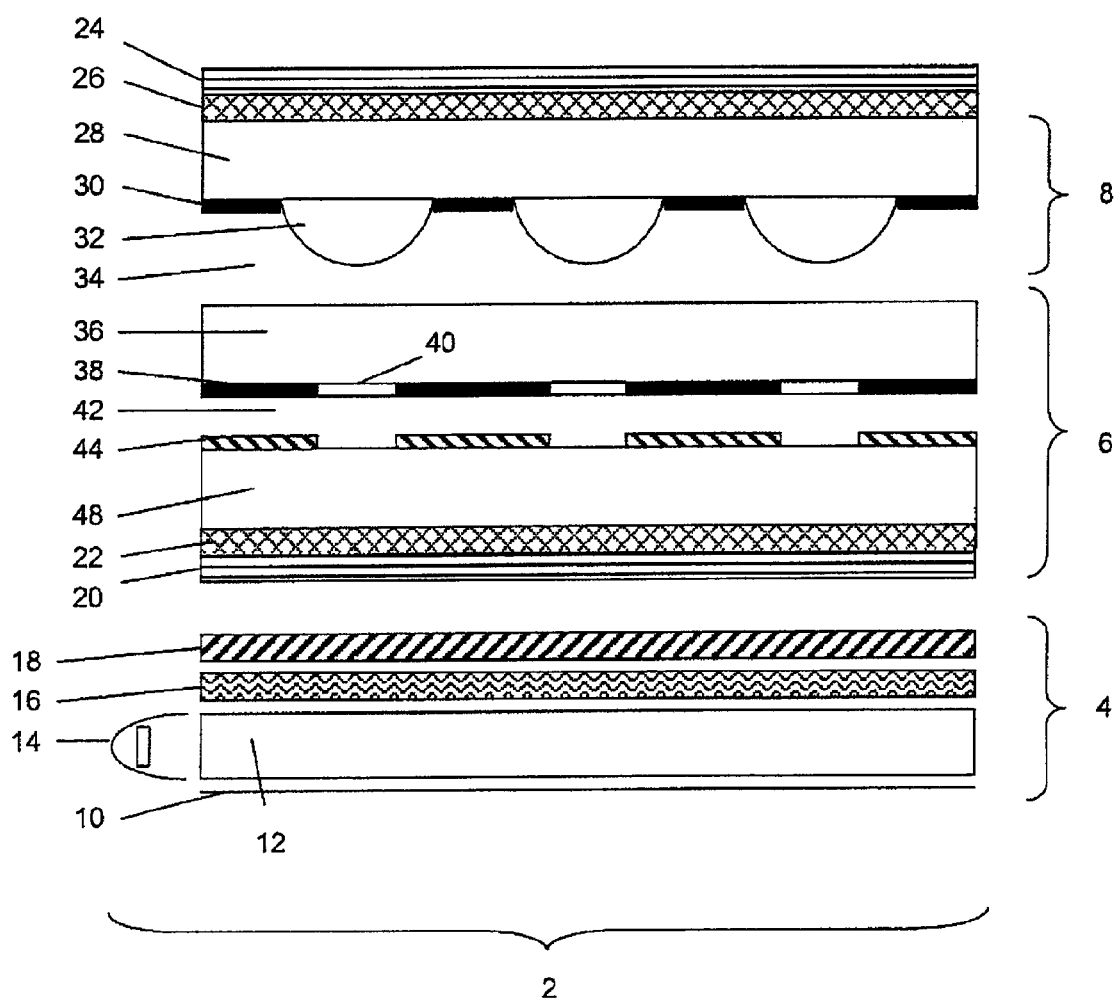

F I G. 1 0
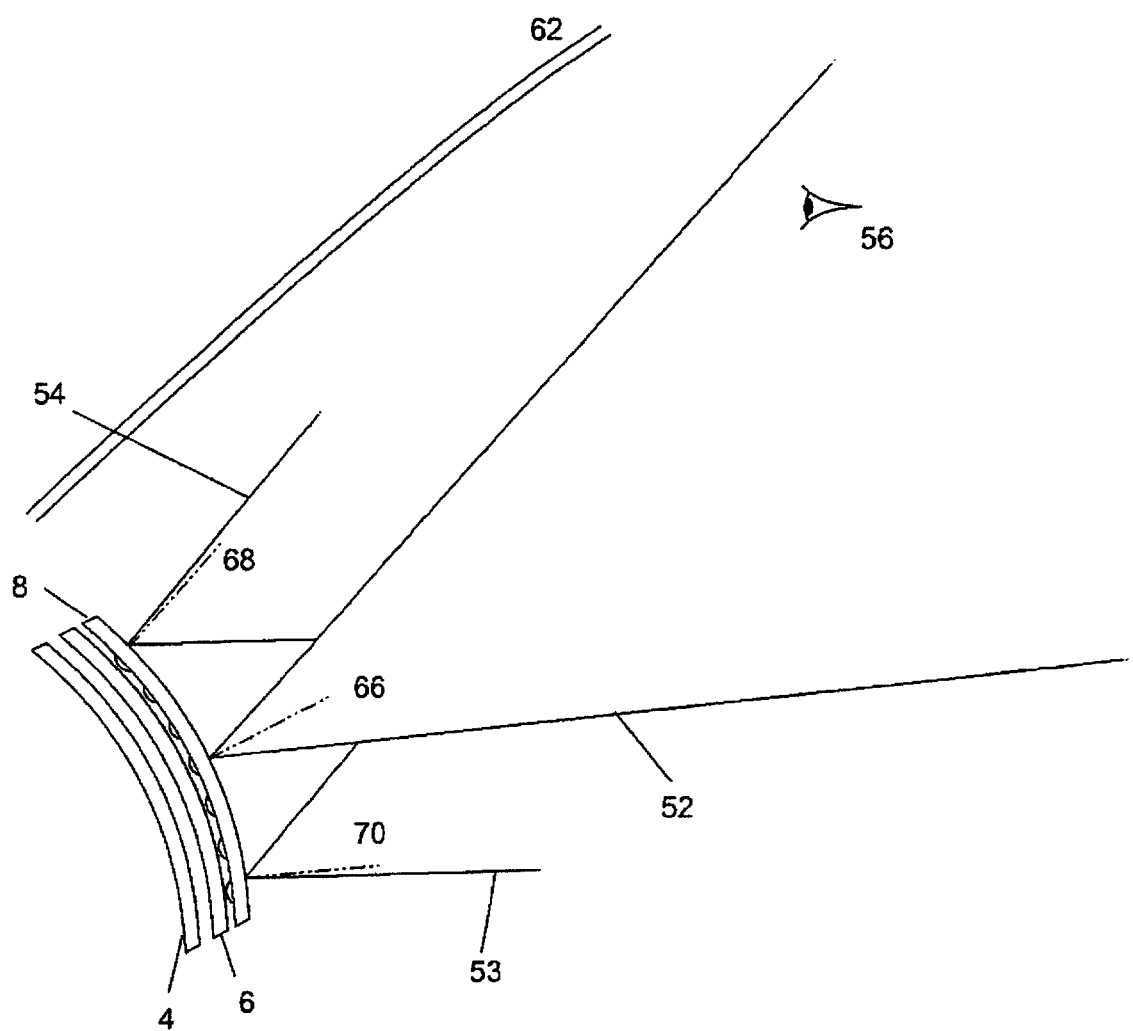

F I G. 1 1
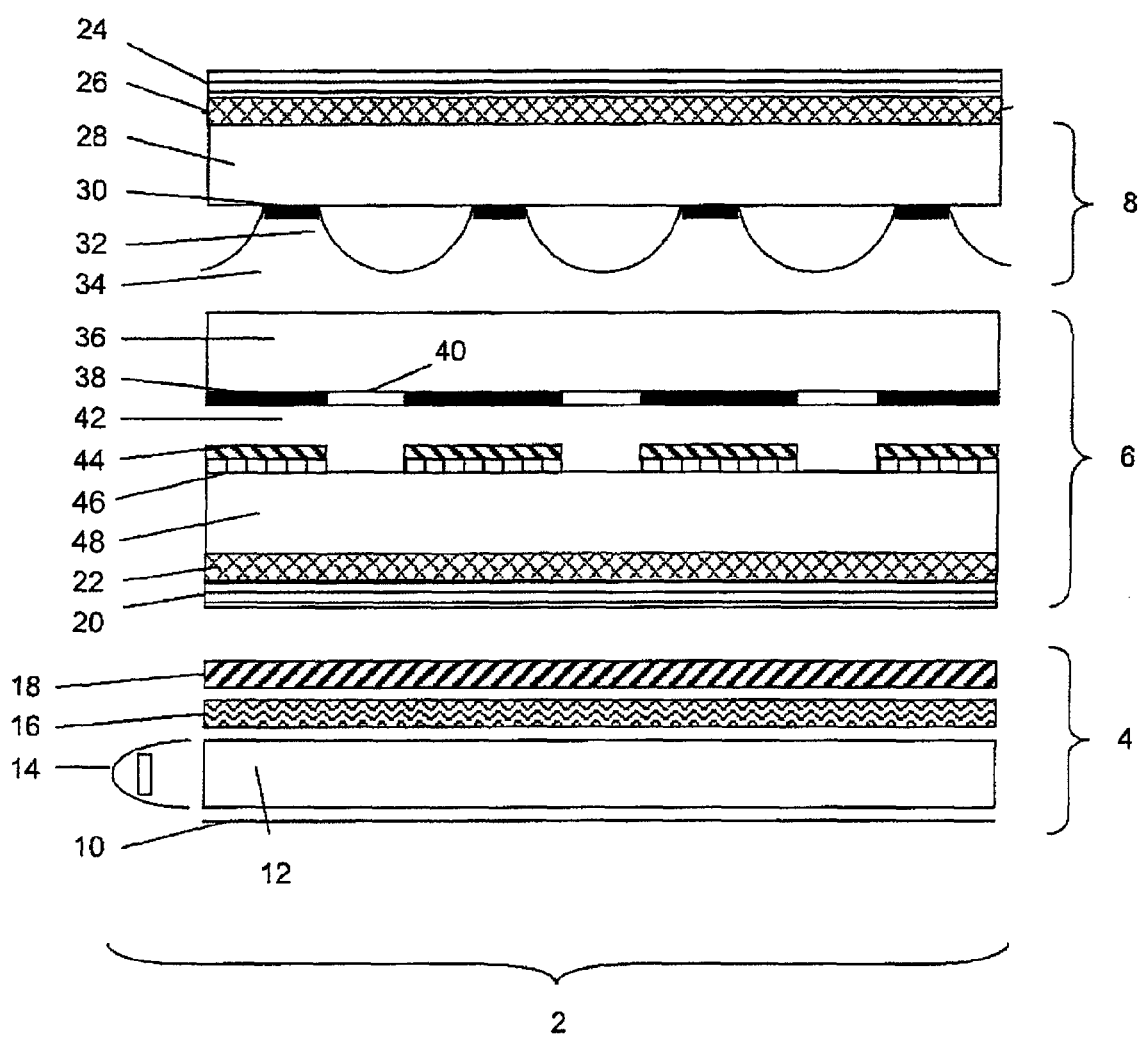

F I G. 1 6
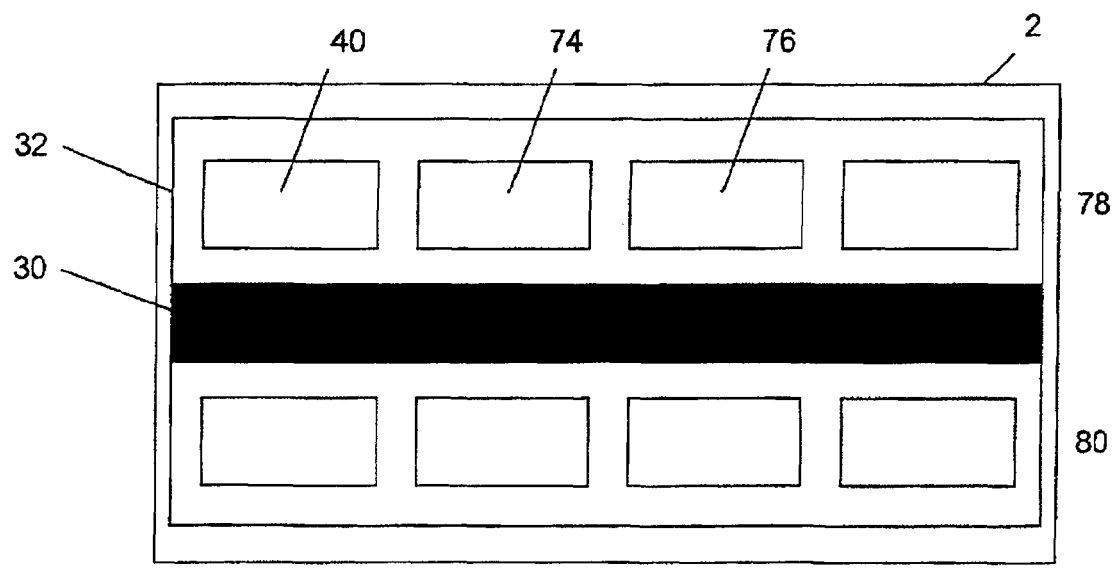
F I G. 1 7
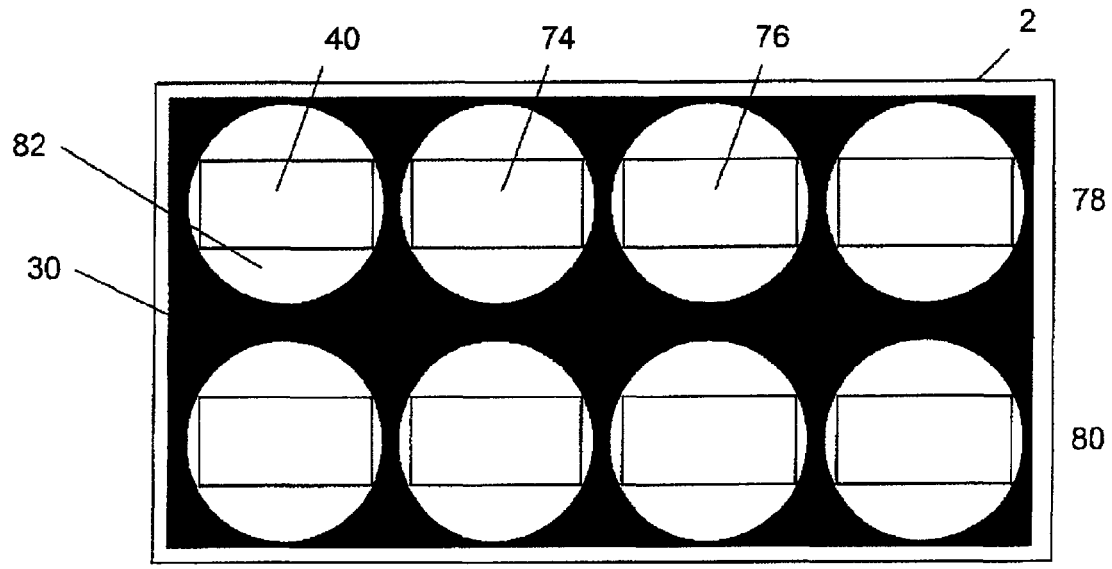

F I G. 1 8
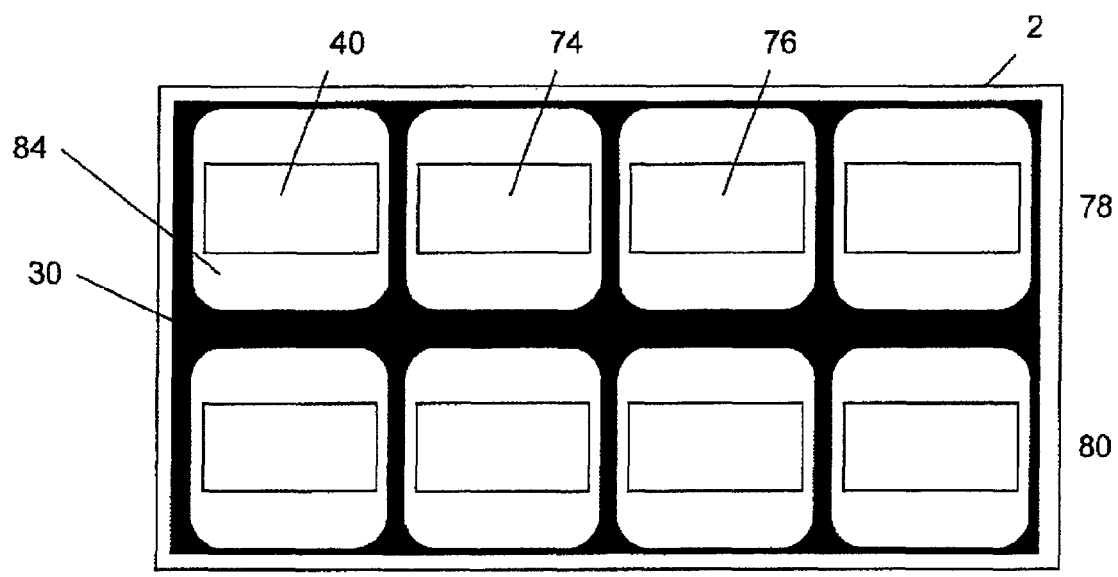
F I G. 1 9
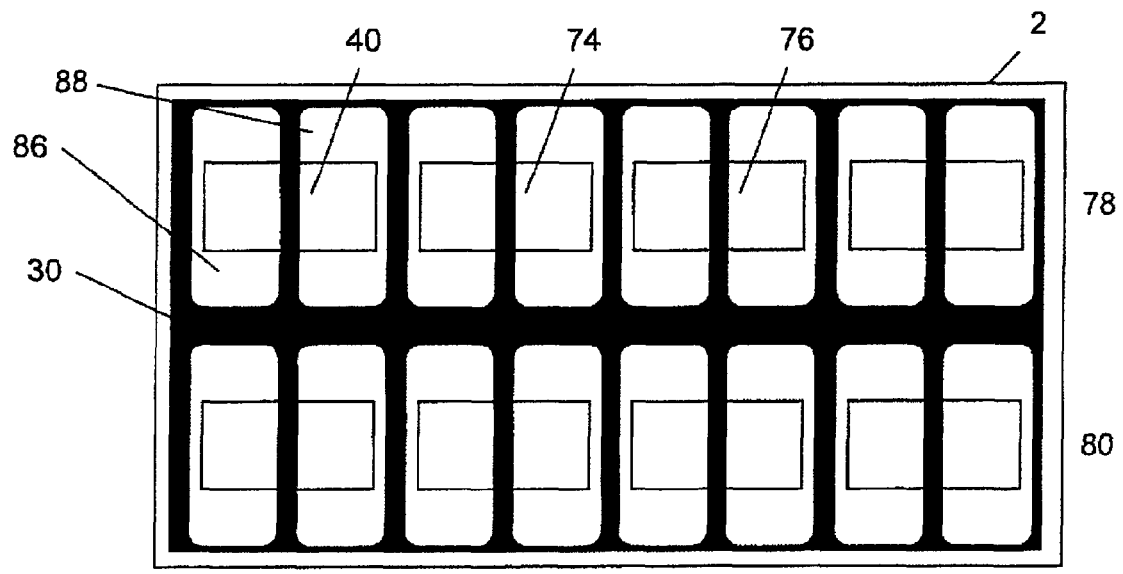

F I G. 2 0
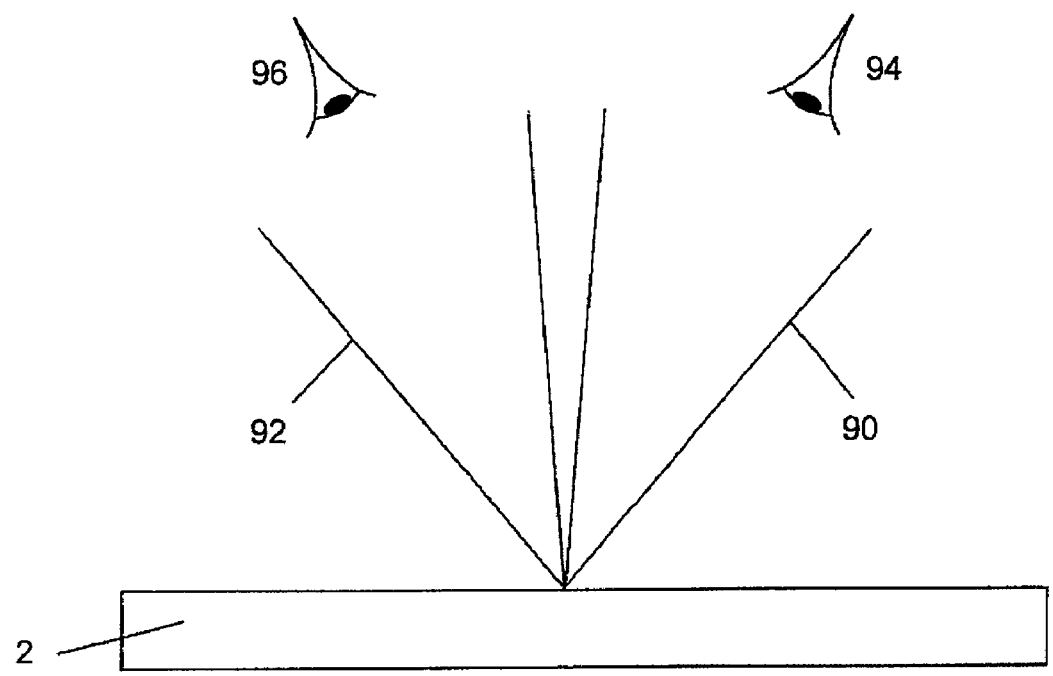

F I G. 2 6
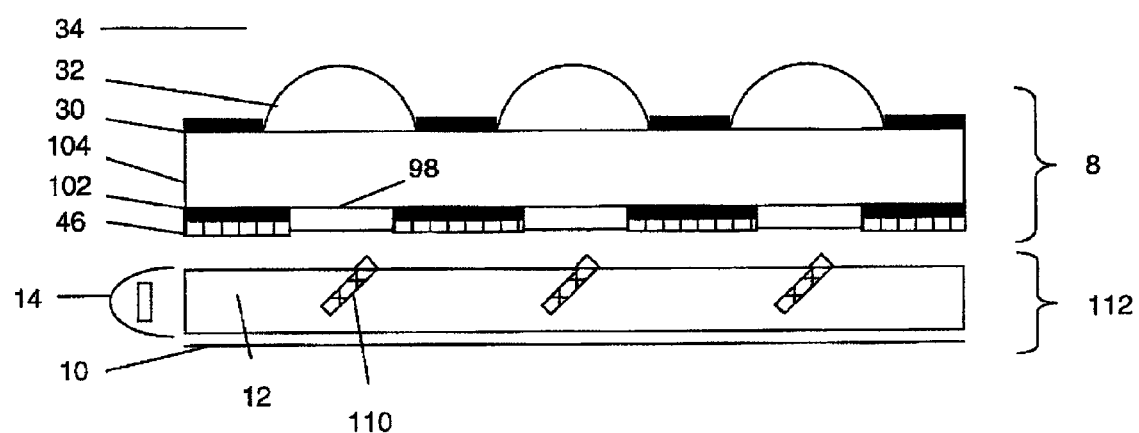
F I G. 2 7
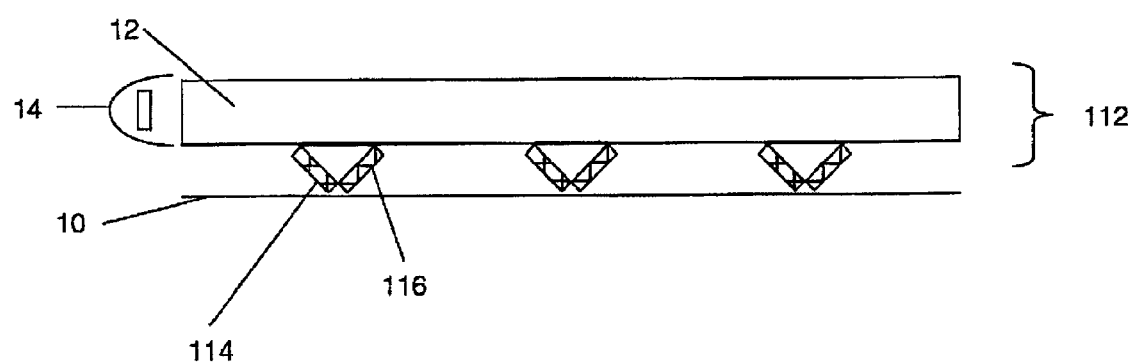

FIG. 30
(a)
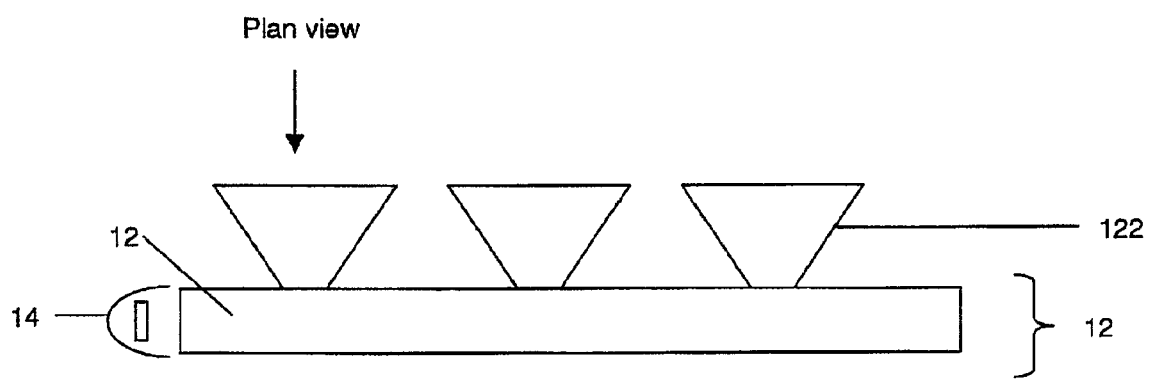
(b)
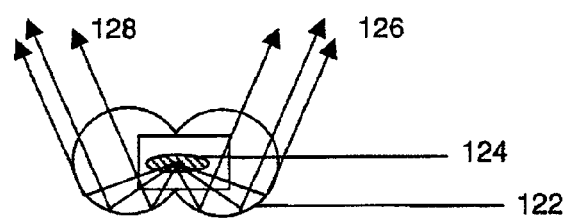

DISPLAY

This Nonprovisional application claims priority under 35 U.S.C. §119(a) on patent Application No. 0813088.2 filed in GB on Jul. 17, 2008, the entire contents of which are hereby incorporated by reference.

TECHNICAL FIELD

The present invention relates to a display in which the angular range of output light is controlled.

There are many applications of illuminators and displays where the angle of light output or the display viewing angle is required to be controlled or limited. For example, in automotive applications of displays, it is desirable to restrict the vertical output angle of light from the display so as to prevent undesirable reflections from a vehicle windscreen in order to reduce or avoid driver distraction, especially in dark environments such as at night. Also, light propagating generally downwardly, for example towards the floor, is wasted and represents a reduction in efficiency of light utilisation.

BACKGROUND ART

US Re 27617 discloses a known type of louvred film for controlling the output angle of light from a display. The film comprises alternating transparent and opaque layers in an arrangement which is similar to a Venetian blind. Such an arrangement passes light which is propagating in a direction parallel and nearly parallel to the planes of the layers but absorbs light propagating at larger angles to these planes. Thus, light propagating in undesirable directions is absorbed and this reduces the efficiency of light utilisation. This type of light control film is relatively inefficient as a significant amount of light propagating at oblique angles is absorbed by the film.

JP 2004/245918 discloses a similar type of louvered film but modified to comprise transparent, reflecting and opaque layers. Again, light propagating parallel and nearly parallel to the louvre planes is transmitted. Light propagating at higher angles to the planes and generally upwardly is reflected downwardly into a non-viewing region whereas light propagating at higher angles generally downwardly is absorbed. Again, the efficiency of light utilisation is relatively low.

U.S. Pat. No. 5,204,160 discloses a similar type of louvered film to US Re 27617 but modified to include microlenses between the opaque layers. In addition the light absorbing regions are formed from grooves which are filled with absorbing material.

US2006/0245060A1 describes a view angle control sheet consisting of trapezoidal lenses with wedge shaped regions between that are filled with a material of lower refractive index. Further, the document provides formulae for the slope of the wedge shaped regions in terms of the refractive index of the two media. The document claims to reduce the brightness decrease observed with films like that disclosed in US Re 27617. The document also discloses that the wedge shaped regions may be absorbing or contain particles to scatter light.

US2007/0076406A1 discloses a similar type of light control film to US2006/0245060A1, but the application is to widen the viewing angle of a display rather than restrict the viewing angle to a certain range. Also, the document aims to prevent a reduction in contrast by reducing the amount of ambient light that is incident upon the display. US 2007/0076406 relates to a light controlling sheet that is intended for use with a light source portion in order to provide a collimated backlight. In FIG. 1, for example, which illustrates a typical SLM display, a light controlling sheet 50 is provided between the light source portion 4 and a liquid crystal panel, in order to provide a collimated light source. The light control film of this application is designed to be placed between the backlight and the liquid crystal panel.

U.S. Pat. No. 7,236,286 describes a device similar to U.S. Pat. No. 5,204,160 and US2006/0245060A1 with triangular shaped louvers, but with reflective parts under the base of the wedge shapes to reflect ambient light. The base of the wedges are placed towards the ambient illumination and the application is to trans-reflective displays such that the display is viewable in both transmission and reflection. The film performs no function for controlling the viewing angle of the device.

U.S. Pat. No. 6,876,408 discloses a light collimating plate that is intended for use with a backlight to produce a collimated backlight. The light collimating plate is applied to widen the viewing angle of liquid crystal displays by collimating light so that it passes through the liquid crystal layer at substantially normal incidence, and then diffusing the light at the output side of the liquid crystal display (LCD). By passing the light through the LCD in a substantially normal manner, the off-axis birefringence of the liquid crystal, which would normally alter the propagation of light compared to the normal direction, is not used, and so the angular properties of the LCD are improved. The collimating plate is disposed between the lamp housing and the liquid crystal panel, and a diffusing plate is disposed between the LCD and the viewer. The light collimating element consists of circular microlenses on one side of a substrate and circular apertures on the other with the aperture opposite the apex of the microlens. A light shielding layer is formed on the opposite side of the substrate to the microlens and covers an area other than the aperture. A formula is provided for calculating the diameter of the lenses required in terms of the thickness of the substrate, the refractive index of the substrate, and the diameter of the apertures. The diffusing plate consists of a microlens array having, on its flat exit surface, a light shield layer and an anti-reflective coating that are provided everywhere except over light exit areas that are aligned with the optical axes of the microlenses. The diffusing plate is provided with the purpose of refracting light that has passed through the LCD in a substantially normal direction into a wider set of angles, so as to render the LCD viewable by users from all viewing directions.

US2007058127A1 discloses a multiple-view display that is produced using a parallax barrier substrate, and a method of manufacturing a parallax multiple-view display. A number of options for the parallax substrate are described, but it includes a parallax optic comprising a microlens array placed in registration with apertures, and absorbing regions spaced between the apertures. In order to produce a multiple view display, the microlenses must image a plurality of apertures or display pixels, each aperture or display pixel being imaged to a different viewing direction. The application is concerned with increasing the brightness of a multiple-view display, of increasing the angular separation between the viewing windows, and in reducing the cross-talk between viewing windows.

US2007058258A1 is a continuation in part of US2007058127A1 The application again discloses a multiple view display produced by the action of a parallax optic, but now the parallax optic consists of microlenses spaced apart within the display element.

U.S. Pat. No. 6,697,042 is directed specifically to a "backlight assembly for collimated illumination", and is designed to be used in a display device in which multiple display panels are tiled together. The use of a collimated backlight allows light to pass normally through multiple display panels placed close together. If the resulting light is imaged using a diffusing plate then the gap between the display panels can be made to appear invisible. In this application the "cavity exit plate" shown in, for example, FIG. 3 is clearly intended to be disposed over the exit face of a cavity that includes a number of light sources; there is no disclosure or suggestion of providing the cavity exit plate over the exit face of a display as this would not allow the invention to fulfill the intended application as described above.

U.S. Pat. No. 6,762,883 discloses a lenticular lens sheet having an entrance surface comprising an entrance lens part and an exit surface comprising an exit lens part. Light rays refracted by the lens elements of the entrance lens part is directed to an exit lens part of the exit surface.

U.S. Pat. No. 5,396,350 describes a backlight waveguide. A light source is used to illuminate a waveguide, and light is guided down the waveguide by total internal reflection. Inverted prism features are provided on the surface of the waveguide to extract light from the waveguide.

WO2005/071474 describes a display in which the angular range of output light is controlled, for example into viewing ranges corresponding to intended observer positions.

JP 2007-333867 describes an angle of visibility controlling element including an azimuth difference barrier which has a "shade part S" and a "transparent part T". The azimuth difference barrier can be created by patterning a light blocking material such as chromium.

U.S. Pat. No. 5,528,319 discloses a privacy filter having two spaced grids, each of which is formed of an array of "blocking members" having transparent space there between.

EP0599451 and US2002/0158967 describe further examples of a privacy filter using a louvre film.

GB2426352 relates to the use of a control element to generate a "confusing image" which is visible at high viewing angles, so that the image on an underlying display can be understood by an observer only at low viewing angles.

US2007/0058127 discloses a display having an image display element and a lenticular array forming a parallax optic. A black mask may be provided between the lenses of the lenticular array.

FIG. 1 of the accompanying drawings illustrates a typical SLM display, 2, of known type. This type of SLM display is common in, for example, such devices as mobile phones, notebooks and automotive displays. It consists of a display, 6, (such as a liquid crystal (LC) display) with front, 24, and rear, 20, polarisers and front, 26, and rear, 22, compensation films for increasing the range of viewing angles. The active part of the LC display typically consists of a front substrate, 36, on which are formed apertures, 40, which may be colour filters and black matrix absorber, 38, and a rear substrate, 48, on which are formed thin film transistors (TFT), 44. Both substrates may also include electrodes (not shown) and alignment layers or other structures (not shown) for aligning the liquid crystal, 42. It can also consist of a backlight unit, 4. This consists of illumination devices (e.g. light emitting diodes, LEDs), 14, a light-guide, 12, a back reflector, 10, a series of backlight enhancement films (BEFs) and diffusers, 16. A BEF film from 3M, 18, may be placed between the backlight and the display panel to enhance the brightness of the display. The viewing angle of the display may be restricted in a particular direction by the inclusion of a Light Control Film, 50, such as the film made by 3M which is of a louvre type. Such films are used as a privacy filter to prevent other people viewing the display, or to prevent unwanted reflections from a car windscreen in an automotive environment or from a cockpit canopy in an aircraft etc.

DISCLOSURE OF THE INVENTION

A first aspect of the present invention provides a display comprising: a single-view image display panel; and a parallax optic disposed over a display face of the image display panel for restricting the angular spread of light output from the display face of the image display panel.

The display panel may be a pixelated display panel and an element of the parallax optic may be associated with no more than one pixel of the display panel or with no more than one line of pixels of the display panel. By "associated with" is meant that an element of the parallax optic images no more than one pixel or one line of pixels (i.e. images a pixel or a part of a pixel or a line of pixels or a line of parts of pixels.) A "line of pixels" includes a row of pixels and a column of pixels. Arranging the elements of the parallax optic to image a line of pixels will provide control of the viewing angle range in a direction perpendicular to the line, so that arranging the elements of the parallax optic to image a row of pixels will provide control of the viewing angle range in the vertical direction, whereas arranging the elements of the parallax optic to image a column of pixels will provide control of the viewing angle range in the horizontal direction.

The term "pixel" as used herein relates to the smallest picture element of the display. In the case of a colour display, a "pixel" is usually associated with a colour filter of a particular colour, with a full colour display comprising red, green and blue pixels.

The pitch of elements of the parallax optic may be equal to the pitch of pixels of the display, for example in the case of a flat display.

Each element of the parallax optic may be offset with respect to an associated pixel of the display, in a direction parallel to the display face of the display. This results in a range of viewing angles having a bisectrix that is not perpendicular to the face of the display.

The pitch of elements of the parallax optic may be less than the pitch of pixels of the display or may be greater than the pitch of pixels of the display. When applied to a non-planar display, this allows the bisectrix of the viewing window to lie along the same direction over the area of the display.

The pitch of elements of the parallax optic may be constant across the display, or it may vary across the display.

The parallax optic may be a microlens array. A microlens array concentrates more light in the pixels of the display, thereby providing a brighter display or allowing pixel size to be reduced.

The spacing between the microlens array and the pixels of the image display panel may be approximately equal to the focal length of the microlens array.

The microlens array may be integral with the display face of the image display panel.

The display may comprise a layer of material having a refractive index lower than the refractive index of the microlens array, the layer being disposed directly adjacent to the microlens array. The microlens array may be spaced from the image display panel by the material having a refractive index lower than the refractive index of the microlens array.

The microlens array may comprise light-absorbing material provided between lenses of the microlens array.

The elements of the parallax optic may restrict the angular spread of light output from the display face of the image display panel in one direction, or they may restrict the angular spread of light output from the display face of the image display panel in two orthogonal directions. For example elements of the parallax optic may substantially collimate light output from the display face of the image display panel in a first of the orthogonal directions, and they also may restrict the angular spread of light output in a second of the orthogonal directions into a first angular range centred on approximately −30° and a second angular range centred on approximately +30°.

The display may further comprise a reflective material provided behind non-transmissive portions of the image display panel. When a transmissive display panel is illuminated using a backlight, any light from the backlight that is incident on the non-transmissive portions of the image display panel will be reflected by the material and may therefore be recycled by the backlight.

The microlens array may comprise an array of cylindrical lenses, each associated with a line of pixels.

The image display panel may be an emissive image display panel.

Alternatively the image display panel may be a non-emissive image display panel, for example a liquid crystal display panel.

The display may be for use in a motor vehicle or an aircraft.

A second aspect of the invention provides a parallax optic comprising: an aperture array; a microlens array for restricting the angular spread of light transmitted through the aperture array; and non-light transmissive material disposed between microlenses of the array.

The aperture array may be disposed on a first face of a substrate and the microlens array may be disposed on a second face of the substrate, the first face being opposed to the first face.

The aperture array may be disposed on a first substrate and the microlens array may be disposed on a second substrate, the first substrate being opposed to the second substrate.

The parallax optic may comprise a layer of material having lower refractive index than the microlens array, the layer of material being disposed directly adjacent to the microlens array.

The parallax optic may comprise reflective material disposed between the apertures of the aperture array for reflecting light incident on non-aperture portions of the aperture array.

The parallax optic may comprise an array of optical elements, the optical elements being disposed in respective apertures of the aperture array.

The array of optical elements may comprise a second array of microlens.

The parallax optic may be adapted to restrict in two orthogonal directions the angular spread of light transmitted through the aperture array.

The parallax optic may be adapted to substantially collimate light in a first of the orthogonal directions.

The parallax optic may be adapted to restrict the angular spread of light into an angular range in a second of the orthogonal directions into a first angular range centred on approximately −30° and a second angular range centred on approximately +30°.

A third aspect of the present invention provides an illumination system comprising: (a) an illumination panel comprising: at least one light source; a lightguide having first and second facing major surfaces, the first of which comprises an output surface for light, and a minor edge surface through which the at least one light source is arranged to introduce light into the lightguide; and (b) a parallax optic of the second aspect disposed over the output surface of the lightguide.

The optical elements may make contact with the output surface of the lightguide thereby to provide light outcoupling points.

A fourth aspect of the present invention provides an illumination panel comprising: at least one light source; a lightguide having first and second facing major surfaces, the first of which comprises an output surface for light, and a minor edge surface through which the at least one light source is arranged to introduce light into the lightguide; and a plurality of prisms provided on the second major surface for outcoupling light from the lightguide, the prisms being so shaped as to outcouple light in a horizontal direction into a first angular range centred on approximately −30° and a second angular range centred on approximately +30° and to outcouple light substantially collimated in a vertical direction.

A fifth aspect of the present invention provides an illumination panel comprising: at least one light source; a lightguide having first and second facing major surfaces, the first of which comprises an output surface for light, and a minor edge surface through which the at least one light source is arranged to introduce light into the lightguide; and a plurality of reflectors provided at least partially within the lightguide for outcoupling light from the lightguide at a plurality of discrete locations.

BRIEF DESCRIPTION OF THE DRAWINGS

Embodiments of the invention will be further described, by way of example, with reference to the accompanying drawings, in which:

FIG. 2 is a cross-sectional diagram illustrating a parallax optic and a display panel constituting a display of a first embodiment of the invention;

FIG. 10 illustrates a fourth embodiment of the invention;

FIG. 11 is a cross-sectional diagram illustrating a parallax optic and a display panel constituting a display of the fourth embodiment of the invention;

FIG. 16 is a diagram illustrating a parallax optic and a display panel constituting a display of an eight embodiment of the invention;

FIG. 17 is a diagram illustrating a parallax optic and a display panel constituting a display of a ninth embodiment of the invention;

FIG. 18 is a diagram illustrating a parallax optic and a display panel constituting a tenth embodiment of the invention;

FIG. 19 is a diagram illustrating a parallax optic and a display panel constituting a display of an eleventh embodiment of the invention;

FIG. 20 is a diagram illustrating the eleventh embodiment of the invention;

FIG. 26 is a cross-sectional diagram illustrating a parallax optic and an illuminator constituting an illumination system of a further embodiment of the present invention;

FIG. 27 is a cross-sectional diagram illustrating an illuminator constituting a further embodiment of the invention;

FIGS. 30(*a*) and 30(*b*) are respectively a cross-section view and a plan view illustrating an illumination system of a further embodiment of the present invention.

BEST MODE FOR CARRYING OUT THE INVENTION

Embodiment 1

Figure 3:
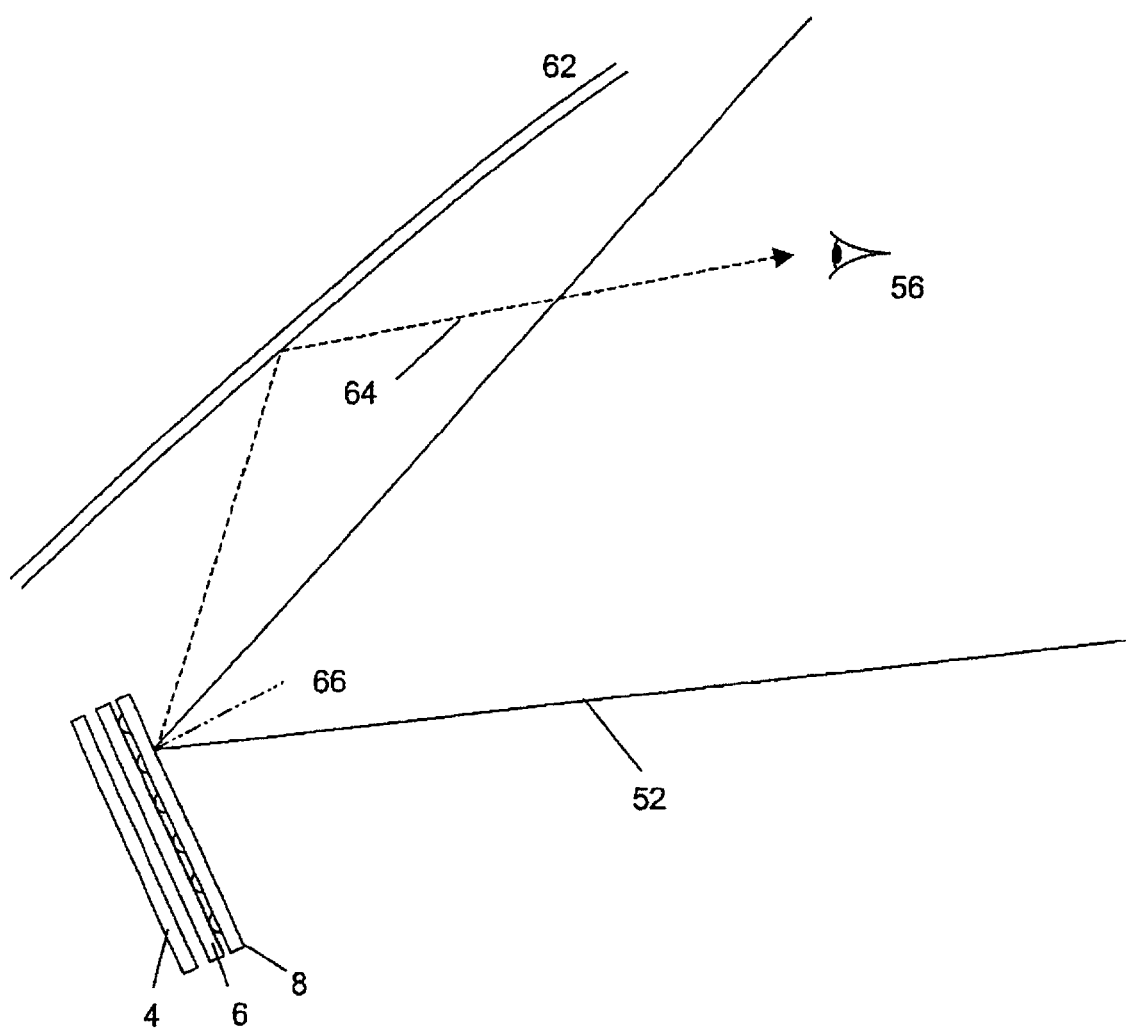
FIG. 3 illustrates a first application of the invention.

A cross-section of display according to a first embodiment of the invention is shown in FIG. 2. According to the invention, a parallax optic, 8, in this example comprising a series of microlenses, 32, is placed in registration with the pixels of a pixellated display panel. The display panel may be a liquid crystal panel comprising a liquid crystal display panel with a backlight behind, in which case the pixels may be represented by the colour filters, 40, or it may comprise an emissive display panel such as an organic light emitting display, or it may comprise any other type of display panel which is made up of a number of pixels. The parallax optic is spaced a defined distance from the front of the display panel by a medium, 34, which may be air or a material with a lower refractive index than the material from which the microlenses are made, and each lens is registered with one pixel aperture such that light is imaged substantially in a direction normal to the panel, 66, within a defined angular range, 52, as shown in FIG. 3. The pixels of the display panel preferably have a precisely controlled aperture, 40, and are spaced apart by absorbing black matrix material, 38, and absorbing black matrix material 30 is preferably also provided between the lenses of the microlens array. The microlenses image the absorbing regions to angular ranges outside the range into which the pixel apertures are imaged. The parallax effect of the microlenses in conjunction with the pixel aperture acts to partially collimate the light coming from the pixel apertures, so that the parallax optic acts as a light control film or light-collimating element. That is, the parallax effect of the microlenses in conjunction with the pixel aperture acts to restrict the angular spread of light output from the display face of the display. The display may thus be designed to have a well defined narrow viewing angle range with a sharp cut-off angle beyond which little light is transmitted.

If such a parallax optic is used in conjunction with a display in an automotive environment as shown in FIG. 3, then it is possible for a viewer, 56, such as a driver, to have an uninterrupted view of the display, 2. Unwanted images, 64, that would otherwise be reflected off a windscreen, 62, are not seen by the viewer. This is because the light emitted by the backlight, 4, that would otherwise be incident on the windscreen 62 is blocked by the parallax optic, 8, and so does not fall within the defined angle range of the viewing region, 52.

The micro-lenses may be separated by absorbing regions.

The micro-lenses may be spaced from the front substrate of the display panel by a glue layer which has a lower refractive index than the micro-lenses or substrate.

The front substrate of the display panel may be reduced in thickness to give a precise spacing of the micro-lenses from the display panel.

The micro-lenses may be cylindrical in form, or they may be substantially spherical, rectangular or square.

The micro-lenses may be plano-convex or bi-convex. The lenses may have the less curved surface closer to the front substrate of the display panel, or further away.

The micro-lenses may be formed directly on the front substrate of the display panel.

The apex of the micro-lenses may be offset from the centre of the pixel aperture, so as to image the narrow viewing window in a direction non-normal to the display panel.

The pitch of the microlens may be constant across the display area.

The pitch of the microlens may vary across the display area.

The absorbing regions between pixel apertures may have a corresponding reflective area formed on the bottom substrate of the display panel so that light incident on these regions from a backlight in a LCD is reflected back to the backlight assembly and recycled, so as to improve the brightness of the display.

It is thus possible to provide arrangements which have a sharper cut-off of light propagation with angle of propagation. This may be used to restrict the visibility of displays and to reduce substantially emission of light into undesirable viewing regions, for example so as to avoid or reduce potentially distracting reflections in vehicle windscreens. Light may be redirected into a desired viewing angle range so that the efficiency of light utilisation is improved. Light whose transmission is blocked may be returned, for example to a backlight arrangement for recycling. Such recycled light is then directed back towards the light control film at least partially in the input acceptance angle so that displayed image brightness may be enhanced and/or light input power may be reduced. Concentrating light into the desired angular output range in which a viewer will be located improves the utilisation of light in the display. Recycling of light from reflective structure improves the efficiency of utilisation. It is thus possible to provide a display of improved brightness for a given light output from a light source with reduced unused and undesirable light output.

Compared to other collimation methods described in the prior art, the performance is markedly improved. None of the prior art describes a method which is capable of producing a narrow viewing range for the propagating light, has a sharp cut-off angle, and which has a higher peak transmission than the display panel alone. In particular, whilst US Re 27617 describes a light control film which has a sharp cut-off angle, the method of US Re 27617 produces an overall reduction in the display panel brightness owing to the light absorption regions that are used to control the angular propagation of the light. This is true for all other louvre-type light control films.

Compared to the light collimating films of U.S. Pat. No. 6,876,408 and U.S. Pat. No. 6,697,042, the light collimating element of this invention is designed to be placed on the front of the display panel. The prior art places the light collimating elements between the display panel and the backlight so as to direct light through the display panel in the desired fashion. The advantage of placing the light control film on the exit substrate of the display panel is that it can be closely integrated with the display panel, resulting in a much thinner module than otherwise possible. In addition, the light control film can be made to work with emissive and reflective display panels which do not require backlights. Clearly this is not possible for light collimating elements placed behind such display panels.

The operation of this invention is quite different from US2007058127A1. US2007058127A1 is directed to making a multiple-view display, in which different images are displayed to different directions (and viewers). In order to achieve this, in US2007/058127A1 the micro-lenses must be aligned to image multiple display panel pixels to different directions and angular ranges. In this invention in contrast, the parallax optic is applied to a single view panel, with the intention of providing a limited viewing angular range to a single viewer, with no light propagated to angles outside of this defined viewing region. In order to achieve this, there is a direct correspondence between one micro-lens and one display panel pixel (or row/column of pixels in the case of a cylindrical microlens). The optical design required to do this is very different to US2007058127A1, and requires different refractive indices of the optical elements, different micro-lens sizes, and different spacing of the lenses from the display panel pixels. In US2007058127A1 the aim is to maximise the aperture ratio of the display panel pixels in order to achieve the highest brightness display. In this invention, the aperture of the display panel pixels is actually reduced compared to the normal display, in order to achieve a sharp cut-off angle, whist maximising the brightness of the panel in the peak viewing direction. The final difference between US2007058127A1 and this invention is that in US2007058127A1 the parallax optic is used to produce the multiple viewing windows in a horizontal direction, whereas in this invention the narrow viewing angle is produced in a vertical direction.

Embodiment 2 (Preferred Embodiment)

Figure 4:
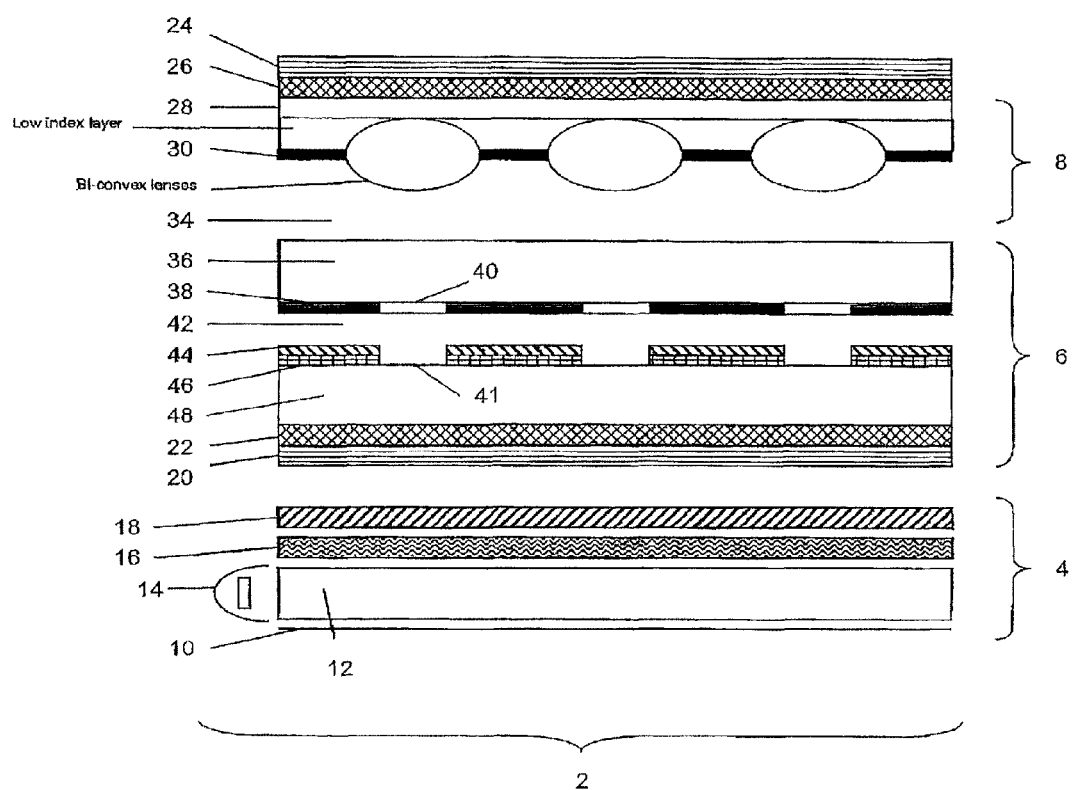
FIG. 4 is a cross-sectional diagram illustrating a parallax optic and a display panel constituting a display of a second embodiment of the invention.

FIG. 4 illustrates a display of an embodiment of the invention, comprising a parallax optic, in this embodiment a microlens array 8, and an image display panel 6. The image display panel is a pixellated image display panel. The parallax optic is arranged such that an element of the parallax optic images no more than one pixel of the display panel or no more than one row/column of pixels of the display panel. In general each element of the parallax optic images one pixel of the display panel or one row/column of pixels of the display panel although, as described with reference to FIG. 19 below, it is possible for two or more elements of the parallax optic to be associated with a pixel (or row/column of pixels) so that an element of the parallax optic images only part of a pixel (or part of a row/column of pixels). FIG. 4 illustrates an embodiment for use in one of the aforementioned applications, in which the parallax optic, 8, is precisely registered such that the apexes of the cylindrical microlenses 32 of the parallax optic are aligned, in a direction parallel to the plane of the display, with the centres of the pixel apertures, 40. The microlenses are spaced away from the front substrate, 36, of the display panel 6 by a material which has a lower refractive index than the microlenses. In the case of convex microlenses, as shown in FIG. 4, the microlenses protrude into the low refractive index material 34, so that the entire surface of the microlenses is in contact with the low refractive index material 34. Ideally the refractive index difference should be as large as possible. Ideally the spacing material, 34, should be air since this has a low refractive index, but sometimes it is necessary to provide some filler for stability reasons. To give the maximum brightness and best cut-off angles at the edge of the viewing region, 52, the display panel, 6, is modified slightly compared to a conventional display panel. The front substrate, 36, is reduced in thickness to ensure the microlenses are spaced at the desired distance from the pixel aperture, 40. In general, the spacing is preferably such that light is brought to a focus at or near the plane of the apertures, although in some applications it may be desired to focus light in a plane slightly offset from the plane of the apertures. Because the microlens array directs light into a desired viewing window, the pixel aperture may be reduced in width compared to a display panel without parallax optic. The corresponding aperture on the rear substrate, 41, is reduced to the same size as the pixel aperture 40, and, ideally, all the regions on the rear substrate that are not clear aperture are coated with a reflective material, 46, to provide as much recycling of light from the backlight 4 as possible. Note that other features on the rear substrate such as gate lines, data lines, storage capacitors, etc are not shown for clarity.

The embodiment of FIG. 4 was made as follows. A standard display panel was modified such that the vertical extent of the pixel apertures 40 and 41 were reduced from 140 μm to 58 μm (the horizontal extent of the apertures were kept the same), reflective areas 46 were deposited under the non-transmissive areas of the rear substrate, and the front substrate was thinned to a thickness of 106 μm. (The terms 'vertical' and 'horizontal' refer to the orientation of the display as seen by a viewer in its intended application.) Absorbing black matrix material was deposited on a substrate, 28, and patterned into stripes such that the width of the stripes was 74.5 μm and the pitch of the stripes was 172.5 μm. Microlenses were formed by coating a resist material of refractive index 1.54 onto the substrate, 28, of refractive index 1.52, to a thickness of about 30 μm. The resist was patterned to the opposite pattern of the black absorbing material, and then melted to form a lens of curvature radius 53 μm and width 98 μm. The parallax element was bonded to the bare surface of the display, 6, using a glue, 34, with low refractive index of 1.34, and a thickness of 37 μm. The front polariser, 24, and compensation film, 26, of the original display panel were laminated to the front of the substrate 28 to complete the whole display.

Figure 1:
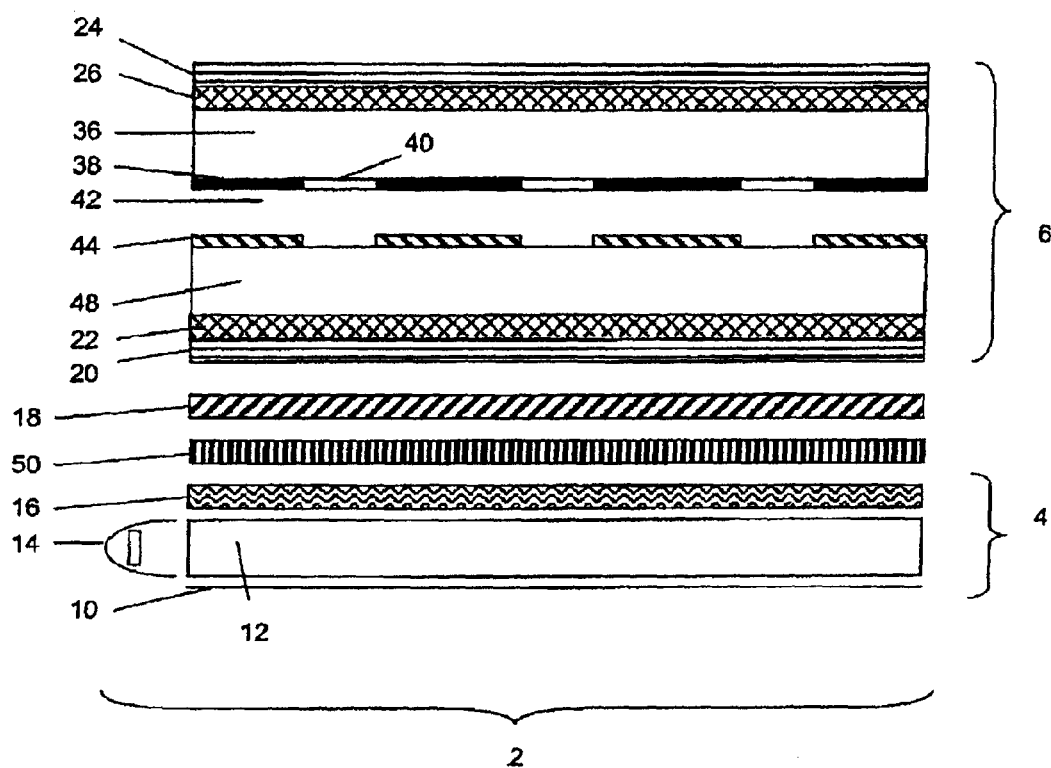
FIG. 1 is a cross-sectional diagram illustrating a display and a light control film of a known type.
Figure 5:
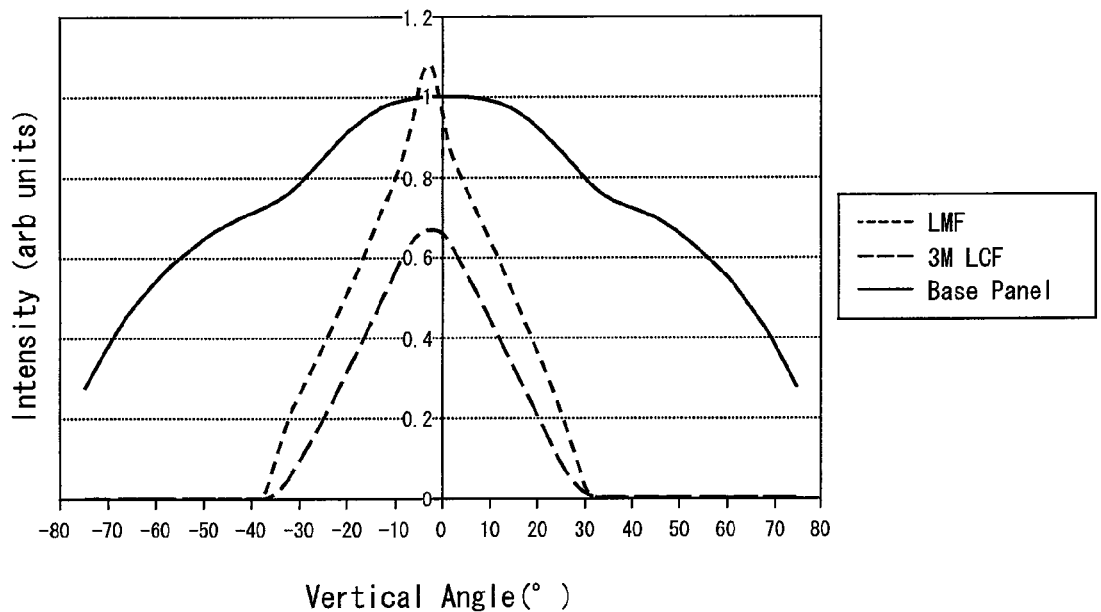
FIG. 5 is a graph illustrating the performance of the parallax optic and display panel of FIG. 4, in a vertical direction.
Figure 6:
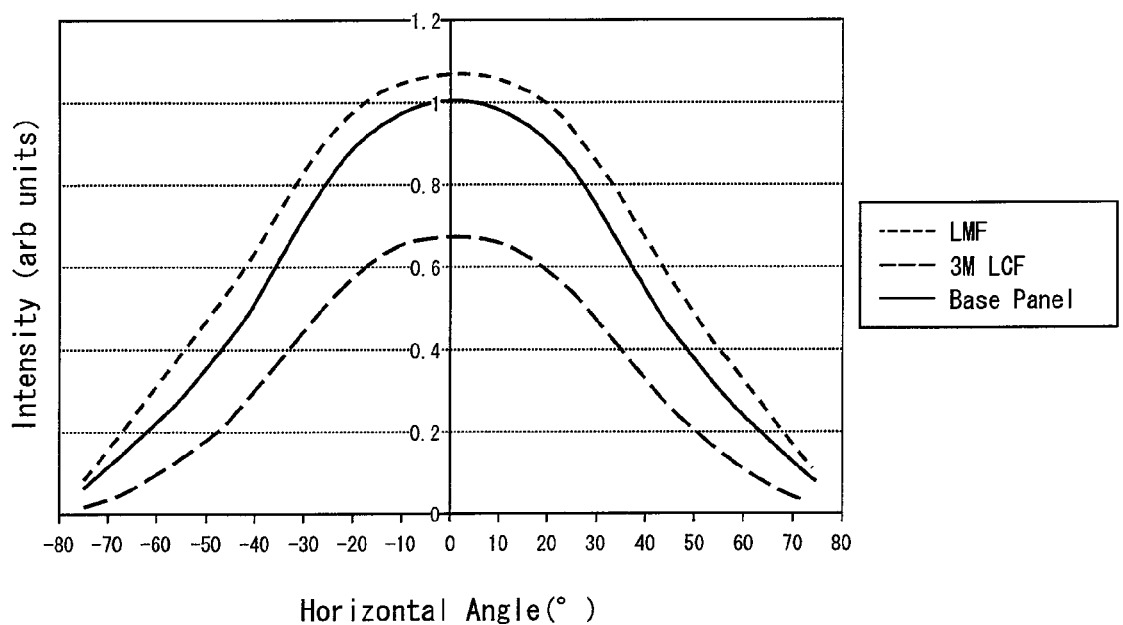
FIG. 6 is a graph illustrating the performance of the parallax optic and display panel of FIG. 4, in a horizontal direction.

The transmission through the display was measured in both vertical, FIG. 5, and horizontal, FIG. 6, directions, and compared to the display of FIG. 1 using a 3M louvre film for the light control film 50. In both FIG. 5 and FIG. 6, the full line denotes the transmission of the display of FIG. 1, the long dashed line (labelled 3M LCF) denotes the transmission of the display of FIG. 1 when provided with a 3M louvre film to form a light control film, and the short dashed line (labelled "LMF") denotes the transmission of the display of the embodiment of FIG. 4. As can clearly be seen, for the same cut-off angle in the vertical direction, the display of this invention has a brightness that is greater than the equivalent display with no light control film, at normal incidence. It can also be seen that light emitted from the display face of the display of this embodiment has a restricted angular spread compared to light emitted from the display of FIG. 1. From FIG. 5 it can be seen that the angular spread, in the vertical direction, of light emitted from the display of the embodiment of FIG. 4 is approximately 70° (from −40° to 30°), whereas the angular spread, in the vertical direction, of light emitted from the display of FIG. 1 is approximately 160° (from −80° to 80°). (In the embodiment of FIG. 4 the angular spread of emitted light is restricted only in one direction (the vertical direction), and FIG. 6 indicates that the angular spread in the horizontal direction in not restricted significantly. However, in other embodiments to be described below the angular spread of the output light may be restricted in two orthogonal directions.)

Embodiment 3

Figure 7:
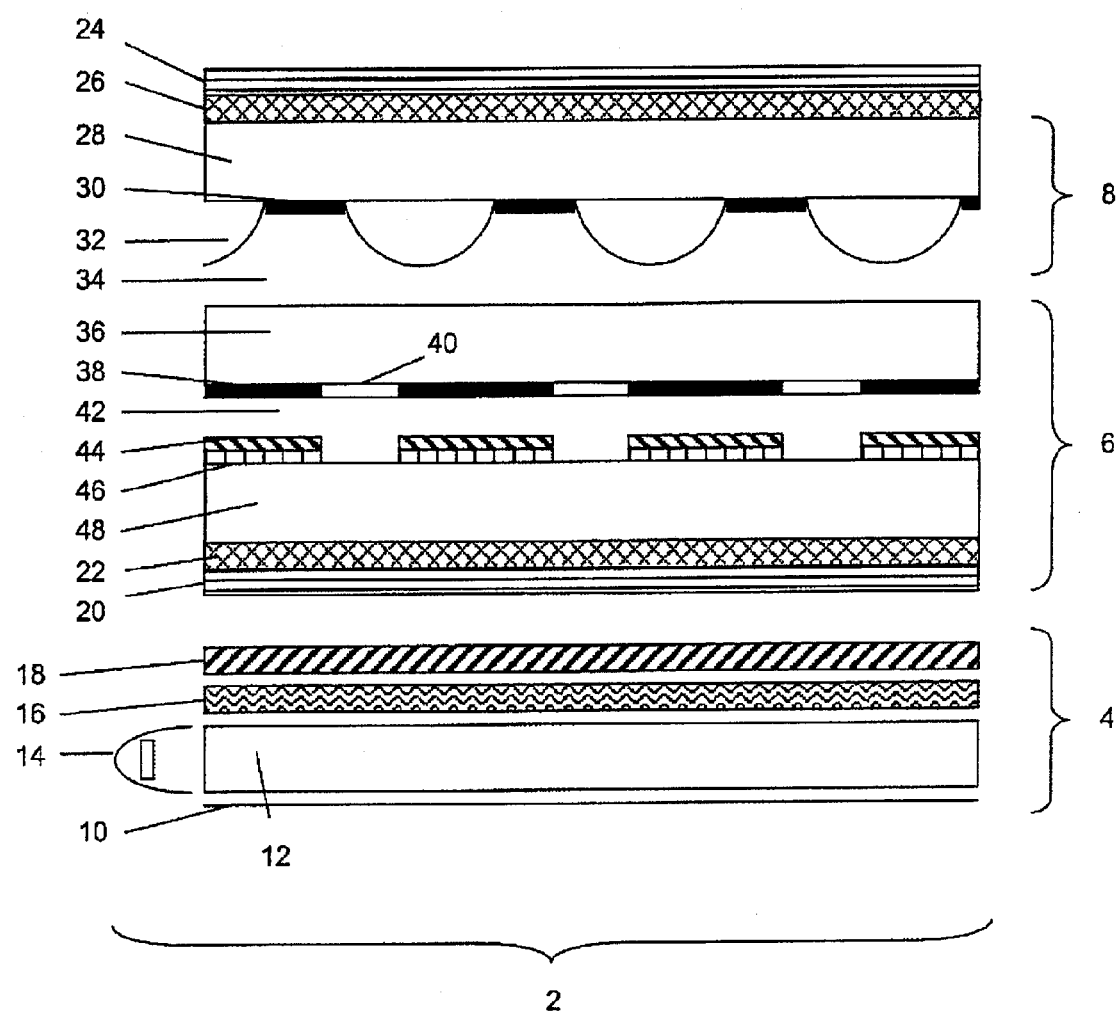
FIG. 7 is a cross-sectional diagram illustrating a parallax optic and a display panel constituting a display of a third embodiment of the invention.
Figure 8:
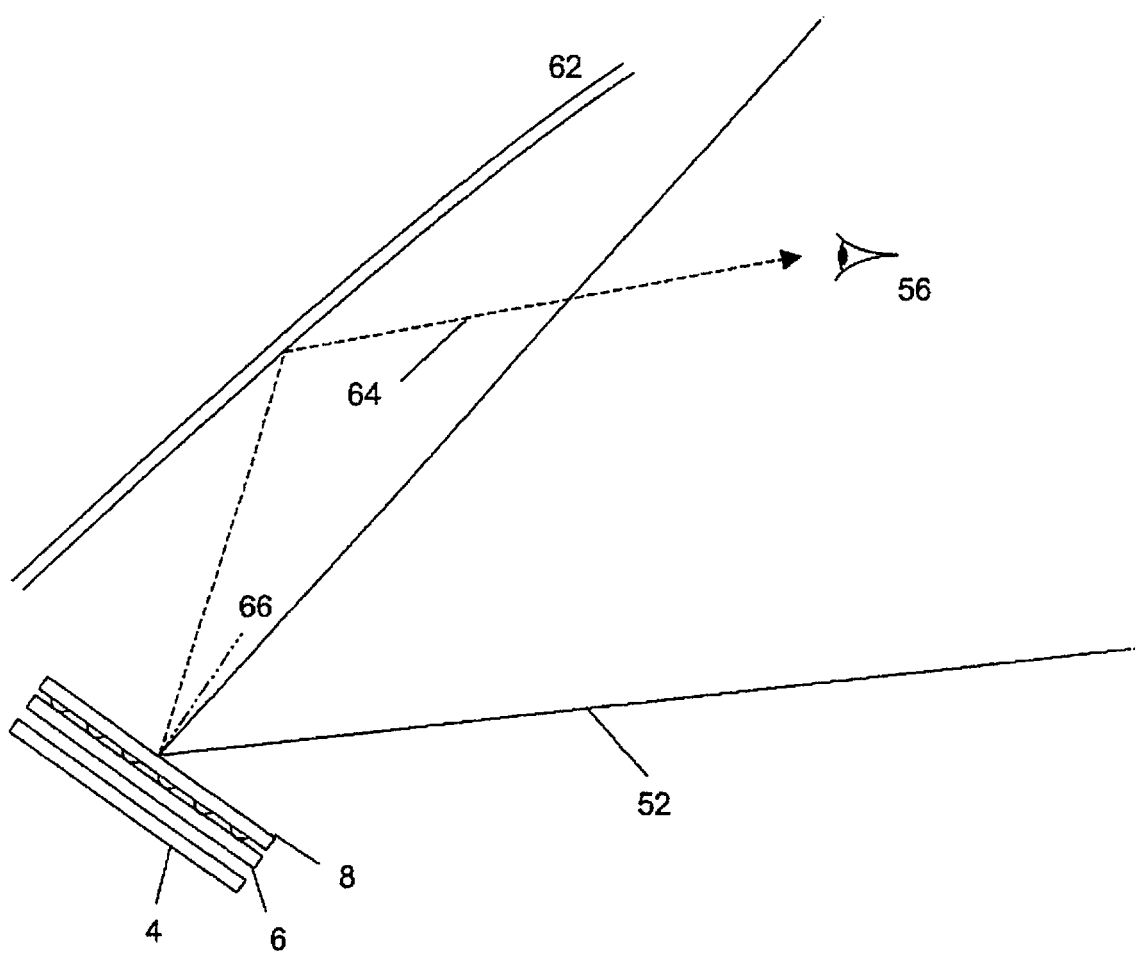
FIG. 8 illustrates a second application of the invention.

In certain situations it is desirable to have the viewing window such that the bisectrix of the angular range of the viewing window is not normal to the display. This is illustrated in FIG. 8, in which the display 2 is tilted in such a way that the viewing window would in part be reflected off the windscreen, 62, of the car and back to the viewer, 56 if the bisectrix is normal to the display face. It is possible to offset the microlens array with respect to the pixel apertures, parallel to the plane of the display, such that the apex of the lens is no longer centred on the pixel aperture, as shown in FIG. 7. Apart from this offset of the microlens array with respect to the pixel apertures, the display of FIG. 7 corresponds generally to the embodiment of FIG. 4 and the parallax optic 8 (in this case a microlens array) again restricts the angular spread of light emitted from the display. Offsetting the microlens array like this will cause the pixel apertures to be imaged in a direction non-normal to the display. If the microlens array were arranged to be moveable in a direction perpendicular to the axis of the cylindrical lens, but in the plane of the display, then it would be possible to move the viewing window around in the vertical angle.

Embodiment 4

Figure 9:
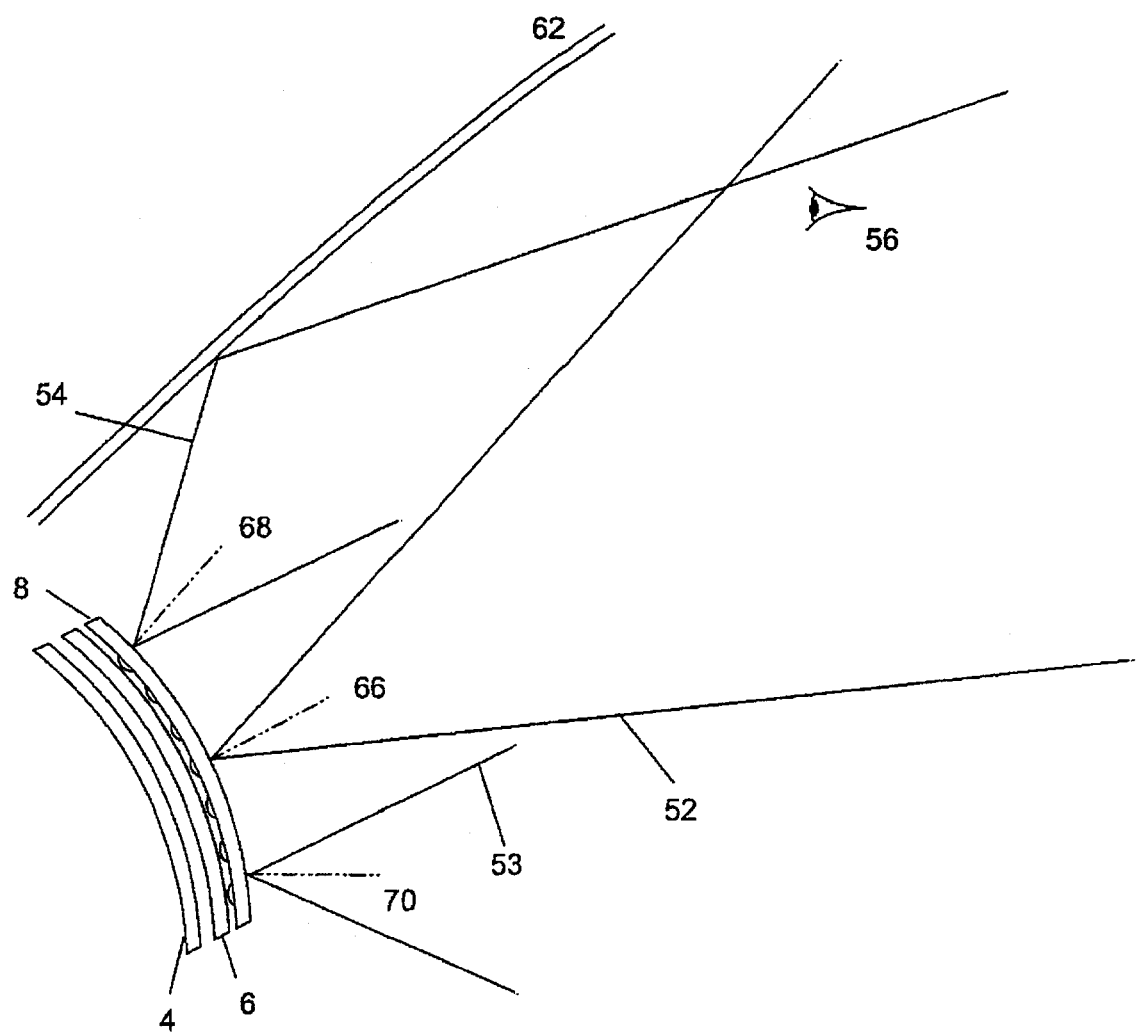
FIG. 9 illustrates a problem associated with the use of curved displays and light control films.

There is a growing desire for displays in cars to be curved or conformal, to match the shape of features such as the car dashboard. If the louvre light control film, 50, of FIG. 1 was used in such a display, the effect shown in FIG. 9 would occur, in which the normal to the display, 66, varies across the surface of the display; at the top, 68, it points more towards the windscreen, and at the bottom, 70, it points further away. The result is that the angular dependence of the viewing window will also vary across the display in the manner shown in FIG. 9, with the viewing window emitted near the top of the display, 54, angled to give rise to windscreen reflections as seen by the viewer, 56, and at the bottom of the display the viewing window, 53, angled to emit light away from the viewer.

This invention allows this problem to be overcome, as illustrated in FIG. 11. By altering the pitch of the microlens in the parallax element such that it is not the same as the pixel pitch of the display panel, the position, in the plane of the display, of the apex of the microlenses with respect to the centre of the pixel apertures can be made to vary in a defined manner across the area of the display. In FIG. 11, the parallax element 8 is shown with the pitch of the microlenses smaller than the corresponding pixel pitch. The result is that at the centre of the display, where the apex of the microlens is in the centre of the pixel aperture, the viewing window is formed with the bisectrix of the viewing window parallel to the normal, 66, of the display, as illustrated in FIG. 10. At the top of the panel, the position of the lens apexes means that the viewing window is formed with the bisectrix parallel to the bisectrix of the viewing window in the centre of the display, now not parallel to the normal of the display at that point, 68. In a similar fashion, the viewing window can be made to be centred on the same angular direction regardless of the position of the viewing window on the surface of the display. Apart from the pitch of the microlens array being different from the pixel pitch of the display panel, the display of FIG. 11 corresponds generally to the embodiment of FIG. 4 and the parallax optic 8 (in this case a microlens array) again restricts the angular spread of light emitted from the display.

If the radius of curvature of the display is not constant, then the pitch of the microlens will also be required not to be constant across the display in order for the bisectrix of the viewing window to be in the same direction over the area of the display. However, if the radius of curvature of the display is constant, then the pitch of the microlens will also be required to be constant across the display.

Although this example is given for a display which is convex as viewed by the viewer, 56, the method may be applied to work with a concave display, in which case the pitch of the microlens array will be required to be larger than the pixel pitch.

In the case of a display curved in two orthogonal directions, the pitch of the elements of the parallax optic is required be different from the pixel pitch in the two orthogonal directions in order to obtain a constant direction of the bisectrix of the viewing window over the display.

Embodiment 5

Figure 12:
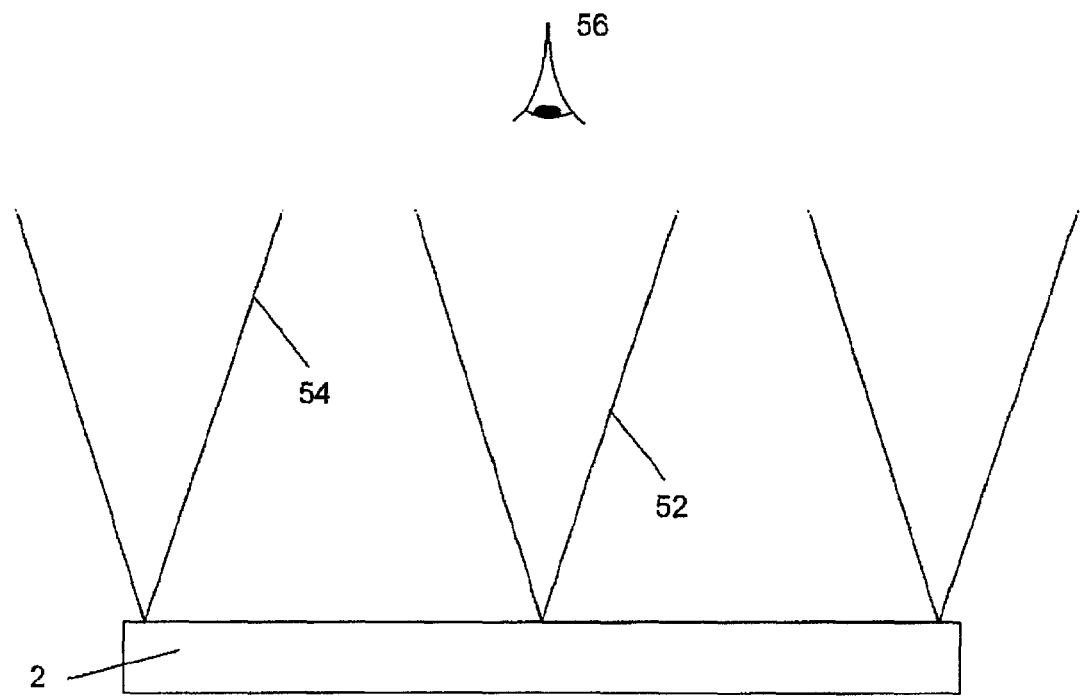
FIG. 12 illustrates a problem associated with the use of large area displays and light control films.

In a similar manner, a problem of using viewing angle restriction filters with large area displays can be overcome. FIG. 12, shows a viewer, 56, positioned in such a way as to subtend a larger angle to a part of the display than the half angle of the viewing cone defined by the light control element, in which case light emitted from those regions, 54, will not be seen by the viewer, 56. The result is that the parts of the display (the edges, if the viewer is located at the centre of the display) appear black.

Figure 13:
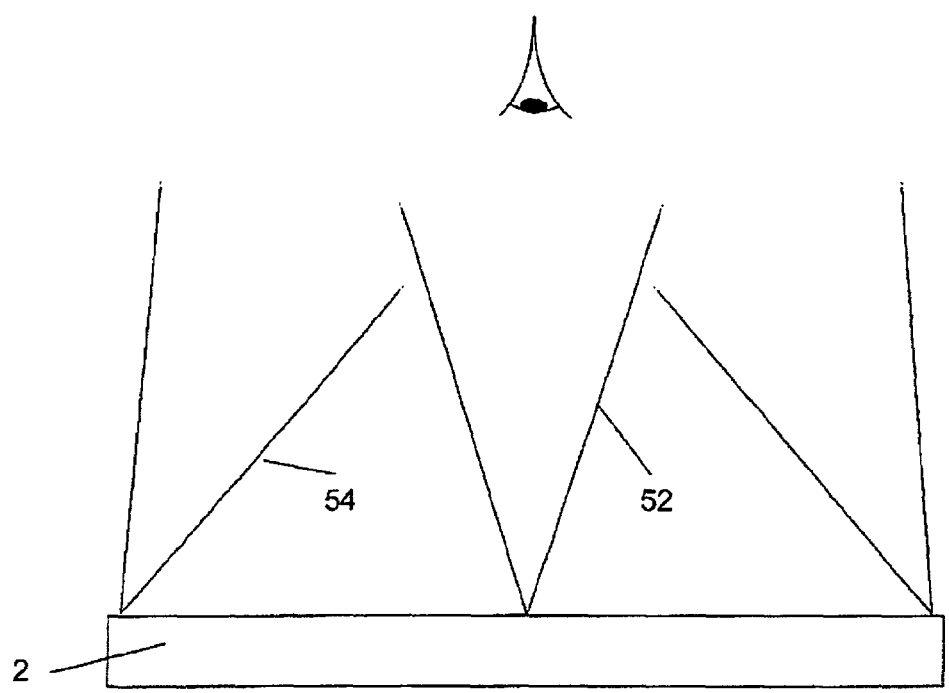
FIG. 13 illustrates a fifth embodiment of the invention.

By using a parallax light restricting film in which the pitch of the microlens array varies across the area of the display, as illustrated in FIG. 11, it is possible to vary the angular direction of the viewing windows, as shown in FIG. 13. Now the viewer, 56, is able to see light emitted from all parts of the display, whilst viewers outside of the range 52 cannot. To obtain the desired effect in FIG. 13, the pitch of the microlens array must be smaller than the pixel pitch of the display panel. The embodiment of FIG. 13 may be effected using a constant microlens pitch, although it may be preferable for the microlens pitch to vary across the width of the display to give the most satisfactory result.

In other embodiments, such as FIG. 10, it may also be required for the microlens pitch to vary across the width of the display.

In both FIGS. 10 and 13, the microlens pitch is required to vary only in one direction, and would not need to vary in a direction into the plane of the paper in FIGS. 10 and 13.

Embodiment 6

Figure 14:
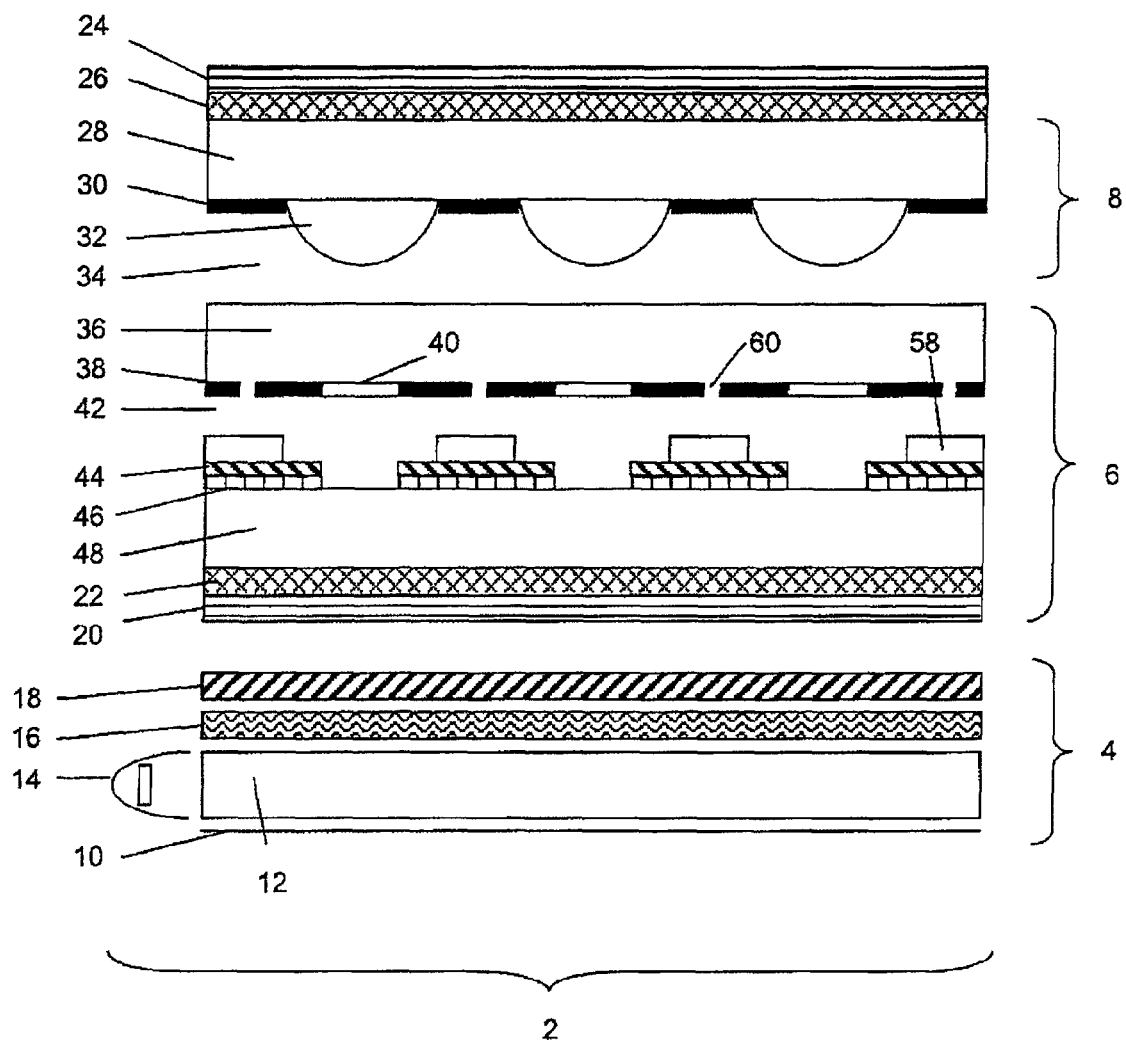
FIG. 14 is a cross-sectional diagram illustrating a parallax optic and a display panel constituting a display of a sixth embodiment of the invention.

FIG. 14 illustrates a further embodiment of the current invention, in which use is made of the non-transmissive parts of the pixel, such as regions 38. Rather than have these regions perform no function, it is possible to include additional functional elements such as a photodiode, which could be co-formed with the TFT or integrated into the same circuitry. By forming a photodiode, 58, in part of the non-transmissive pixel area, it is possible to use such a photodiode for sensing functions, for example as part of a touch sensor. In this case, a light-transmissive aperture, 60, needs to be formed in the absorbing region of the front substrate. By creating this aperture in the centre part of the absorbing region 38 of the pixel it is possible to allow light to reach the photodiodes from the front of the display, while still limiting the formation of secondary viewing windows at very high viewing angles to the display normal. It is also possible to include the photodiode in the clear pixel aperture, but this reduces the brightness of the display. Apart from this, the display of FIG. 14 corresponds generally to the embodiment of FIG. 4 and the parallax optic 8 (in this case a microlens array) again restricts the angular spread of light emitted from the display. Embodiment 6 is described with reference to a display that corresponds generally to the display of FIG. 4, but the features of embodiment 6 may be applied to any of the embodiments described hereinabove.

Embodiment 7

Figure 15:
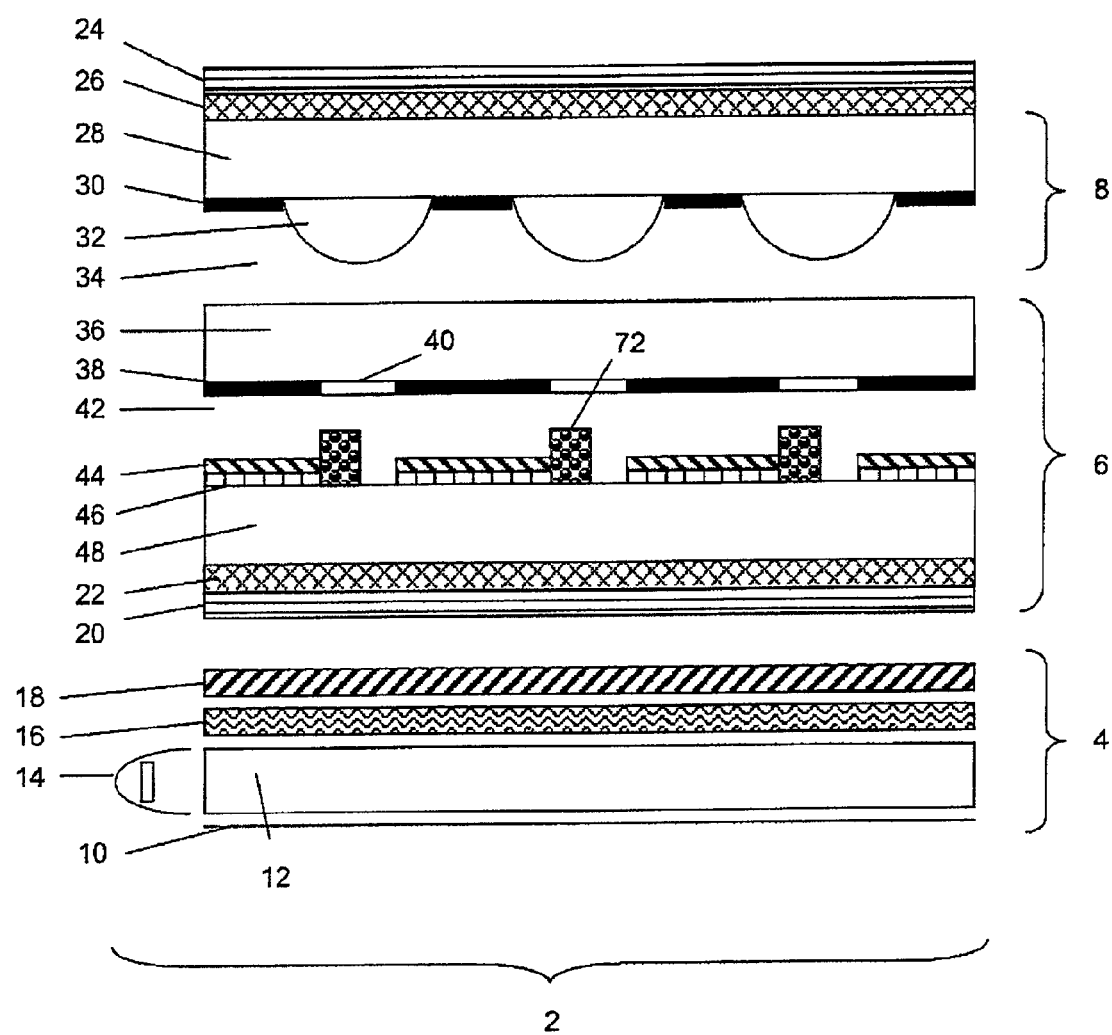
FIG. 15 is a cross-sectional diagram illustrating a parallax optic and a display panel constituting a display of a seventh embodiment of the invention.

Displays that are both reflective and transmissive can be formed by including a reflective region in part of the pixel aperture. Such displays are advantageous because they can be used in all light levels from darkness to very bright sunlight, with the reflective portion becoming more significant as the ambient light level increases. This invention may also be use with such displays, as illustrated in FIG. 15. A reflective structure, 72, is included in the pixel so as to cover part of the clear aperture, 40. The parallax optic works just as well with light that is incident on the front of the display and reflected by the structure 72 as with light emitted by the backlight. Apart from this, the display of FIG. 15 corresponds generally to the embodiment of FIG. 4 and the parallax optic 8 (in this case a microlens array) again restricts the angular spread of light emitted from the display. Embodiment 7 is described with reference to a display that corresponds generally to the display of FIG. 4, but the features of embodiment 7 may be applied to any of the embodiments described hereinabove.

Embodiment 8

All previous embodiments have depicted cylindrical microlenses, which extend into the plane of the paper in the Figures. This is shown more clearly in FIG. 16, which illustrates a plan view of the display, 2, in a simplified manner, showing a part of the display panel, 6, comprising two rows of pixels, 78 and 80, and four columns which would typically each be associated with colour filters of a particular colour, for example, red colour filters, 40, green colour filters, 74 and red colour filters, 76. However it is not the intention of this invention to limit it to three colour filters, and more are possible, for example including white, cyan, magenta and yellow, to increase brightness or colour gamut. The cylindrical microlenses, 32, have their axis aligned parallel to the rows of pixels, 78 and 80, and are interspersed with absorbing regions, for example, black matrix material, 30.

The invention is not however limited to the case of cylindrical microlenses and a number of other options for the shape of the microlenses are possible. FIG. 17 illustrates a ninth embodiment, having a microlens array in which the lenses 82 are substantially circular when seen in plan view and are arranged in a square matrix. If the underlying colour filters and pixels are arranged in a different geometric arrangement, for example triangular, then the lenses should also be arranged in such a fashion. It is merely enough that one microlens is arranged so as to correspond to one pixel. All the area between the microlenses is covered with absorbing material, 30. By forming a microlens which has a lensing power in two orthogonal directions, for example, horizontal and vertical, it is possible to restrict the viewing angle in two orthogonal viewing directions.

FIG. 18 illustrates a tenth embodiment in which the fill factor of the circular microlens array is increased by forming microlenses 84 which are substantially rectangular when seen in plan view. In this fashion the amount of light passing the parallax barrier is slightly increased as the area of the display occupied by the absorbing material 30 is reduced.

The micro-lenses may be plano-convex (as shown in FIG. 4) or bi-convex. The lenses may have the less curved surface closer to the front substrate of the display panel, or further away.

The microlens array of FIG. 17 or FIG. 18 may be applied to any of embodiments described hereinabove.

Embodiment 11

FIG. 19 illustrates a further embodiment of the invention, in which the rectangular microlenses are further subdivided into two smaller rectangular sub-microlenses, 86 and 88, such that there are now two microlenses imaging one single pixel 40, 74, 76. Due to the offset of the pixel under each sub-microlens, the part of the pixel imaged by the sub-microlens is imaged to a direction one side of the panel normal. This is illustrated in FIG. 20, in which the sub-microlens, 86, is responsible for imaging the viewing window, 92, and the sub-microlens, 88, is responsible for imaging window, 90. In this way, it is possible to increase the brightness to certain horizontal directions. This is useful in automotive environments in which viewers are located within certain angle ranges, and there is benefit in directing most of the light from the display towards those viewers, represented in FIG. 20 by the viewers 94 and 96. There is low intensity between the two viewing windows.

Although all of the above examples have referred to a liquid crystal display as the main display element, the invention will work equally well with any other type of display, including emissive displays such as plasma displays, vacuum fluorescent displays, and organic and inorganic electroluminescent displays and other non-emissive displays.

It is the intention that the invention is not limited to the specific embodiments and examples given above, and that others will be obvious to anyone skilled in the art.

Figure 21:
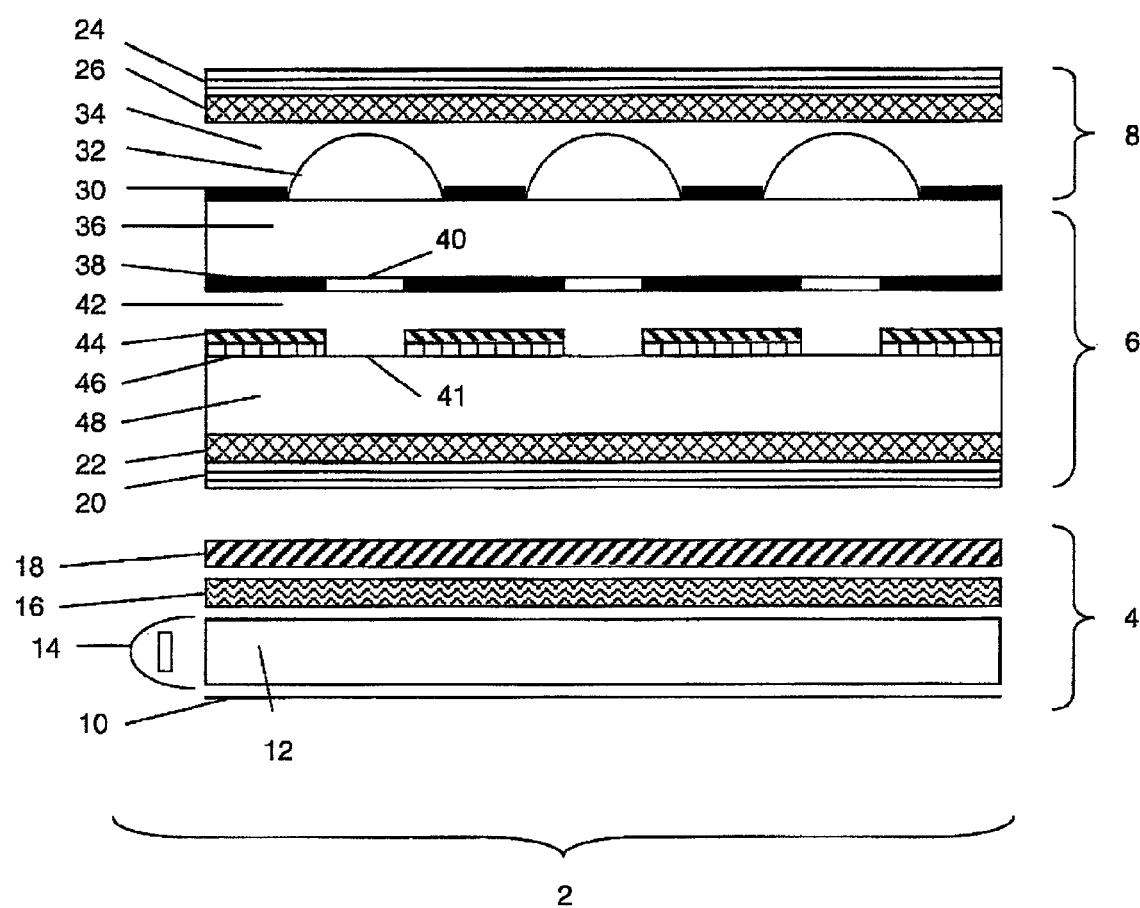
FIG. 21 is a cross-sectional diagram illustrating a parallax optic and a display panel constituting a display of a further embodiment of the invention.

For example, in the embodiments described above, the parallax optic is adhered to the front substrate of the display panel. However, the microlens array may be formed directly on the front substrate of the image display panel. This is illustrated in FIG. 21, which shows a twelfth embodiment in which the microlenses, 32, are disposed directly on the display panel front substrate, 36. Now the additional substrate, 28, is no longer required, but it is still important to have a low refractive index layer, 34, adjacent to the microlenses, 32. Absorbing regions, 30, may be formed between the microlenses, 32. The films normally laminated to the front of a LCD, for example polariser, 24 and compensation films, 26 could be laminated on top of the low refractive index material, 34. The microlenses, 32, could be formed as described before, or they could be formed directly into the front substrate. For example, if the front substrate, 36, was a plastic substrate, then the microlenses could be embossed into the front substrate either as part of manufacture, or post-manufacture. Apart from this, the display of FIG. 21 corresponds generally to the embodiment of FIG. 4 and the parallax optic 8 (in this case a microlens array) again restricts the angular spread of light emitted from the display. The twelfth embodiment is described with reference to a display that otherwise corresponds generally to the display of FIG. 4, but the features of the twelfth embodiment may be applied to any of the embodiments described hereinabove.

Embodiment 13

Figure 22:
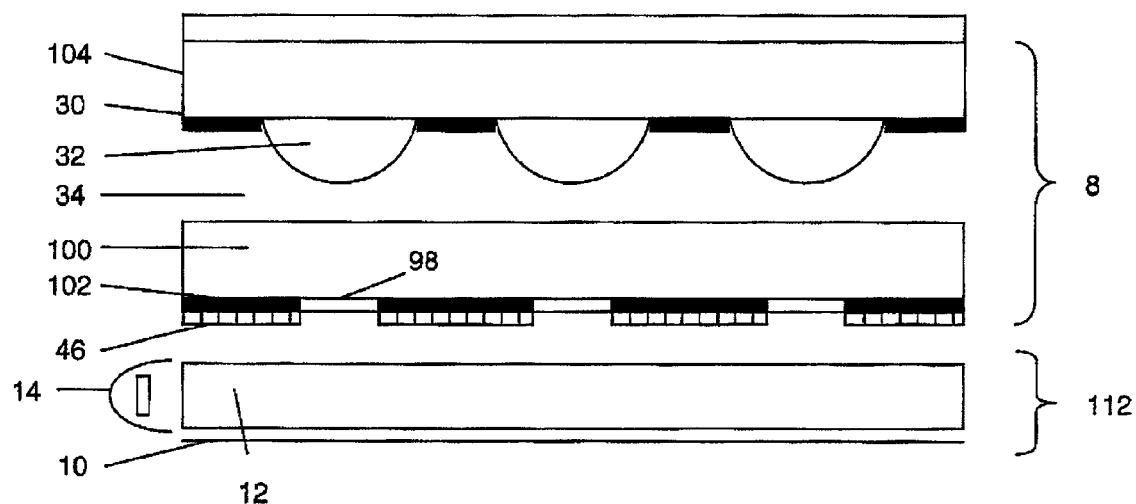
FIG. 22 is a cross-sectional diagram illustrating a parallax optic and an illuminator constituting an illumination system of a further embodiment of the invention.

A parallax optic of this invention may also be used with an illuminator to control the angle of light emission. An example is shown in FIG. 22 in which the parallax optic, 8, is placed in front of an illuminator, 112. The parallax optic comprises a microlens array, 32, a material, 34, of lower refractive index than the microlens array placed adjacent to the microlens array, and an array of apertures, 98, placed in registration with the lenses of the microlens array, as described before. There may be absorbing material, 30, between the lenses of the microlens array. There may be absorbing material, 102, between the apertures, 98. There may be reflective regions, 46, facing the illuminator so as to recycle light that is incident on the non-aperture regions, thus increasing the brightness of the system. In this embodiment, the microlens array is formed on a substrate, 104, that is separate from the substrate, 100, on which the array of apertures is formed. As before, parallax is formed between the microlenses of the microlens array and the array of apertures, and this serves to restrict the angular spread of light emitted from the front face of the parallax optic (compared to the angular spread of light emitted by the illuminator). The illuminator may be a backlight in a liquid crystal display, or it may be a light source for general purpose lighting and illumination of interiors, for example, rooms or external environments, for example, streets.

Embodiment 14

Figure 23:
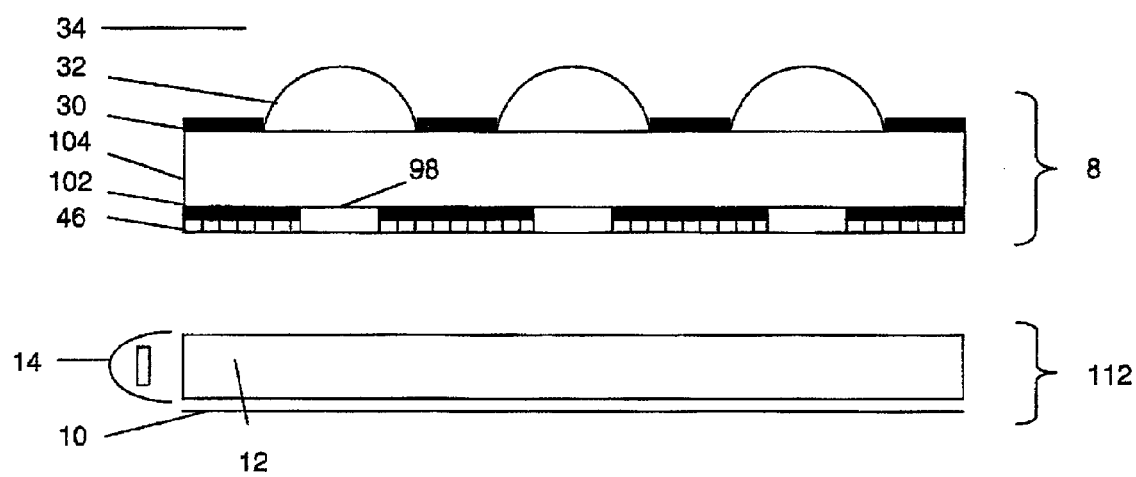
FIG. 23 is a cross-sectional diagram illustrating a parallax optic and an illuminator constituting an illumination system of a further embodiment of the present invention.

It is possible to make the parallax optic of embodiment 13 on a single substrate, rather than through the use and alignment of two substrates. This is illustrated in FIG. 23 in which a microlens array, 32, is formed on one side of a substrate, 104, and an array of apertures, 98, is formed on the opposite side of the substrate such that the two arrays are in direct registration with each other, as described before. A light blocking material 30 is disposed between adjacent microlenses 32, to ensure that all light passing through the parallax optic must pass through one of the microlenses. The regions of light blocking material reduce scattered light, and so reduce the light level in non-desired directions. The regions of light blocking material also allow the diameter of the microlens 32 to be smaller, which increases the focal power thus allowing a tighter collimation of light to be produced for a given aperture size. The thickness of the substrate must be adjusted correctly such that the amount of light passing through the array of apertures, 98, is maximised. Apart from the parallax optic being formed on a single substrate, embodiment 14 corresponds generally to embodiment 13. As before, it is important that the material, 34, adjacent to the microlens array is of a lower refractive index than the refractive index of the microlenses, and preferably close to that of air. A parallax optic formed in this way has the advantage that a fewer number of substrates are required, and no cost is incurred in aligning the two arrays. It is possible that the microlens array and array of apertures could be formed at the same time in the manufacturing process.

Embodiment 15

Figure 24:
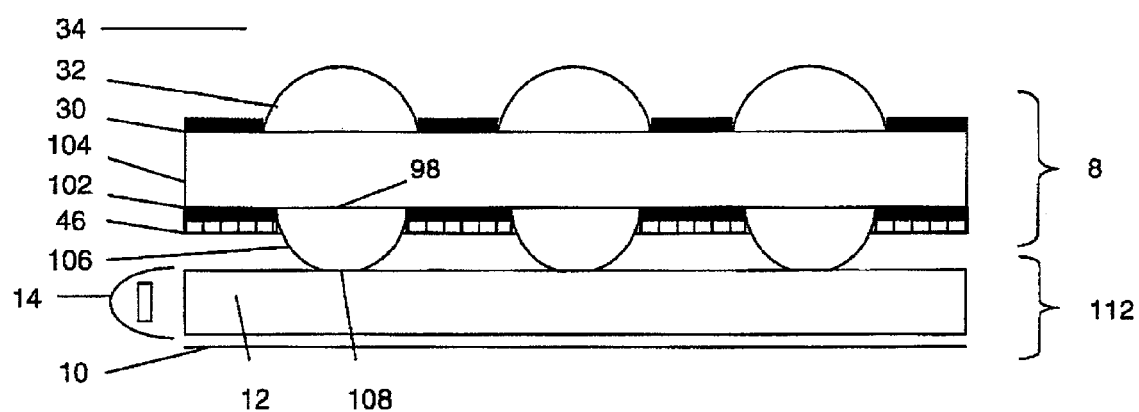
FIG. 24 is a cross-sectional diagram illustrating a parallax optic and an illuminator comprising an illumination panel of a further embodiment of the present invention.

The efficiency of the device in embodiment 14 may be improved still further by placing the parallax optic in optical contact with the illuminator, as illustrated in FIG. 24, which shows an illuminator, 112, comprising a light source, 14, a light guide, 12, and a reflector, 10. The parallax optic, 8, now further comprises a second array of optical elements, 106. In this embodiment the optical elements are another microlens array, precisely registered with the first microlens array, 32, and the array of apertures, 98. The second microlens array makes optical contact with the light guide at points along the light guide, 108. These contact points perform the purpose of providing light outcoupling points from the light guide. In this way the overall efficiency of the system is improved as light is only extracted from the light guide at the desired positions and in this way almost all the light will pass through the array of apertures, 98, and be imaged within the desired angular range. There may be absorbing material, 102, between the optical elements, 106. There may be reflective regions, 46, facing the illuminator so as to recycle light that is scattered from the light guide. Apart from the parallax optic being in optical contact with the illuminator, embodiment 15 corresponds generally to embodiment 13.

Figure 25:
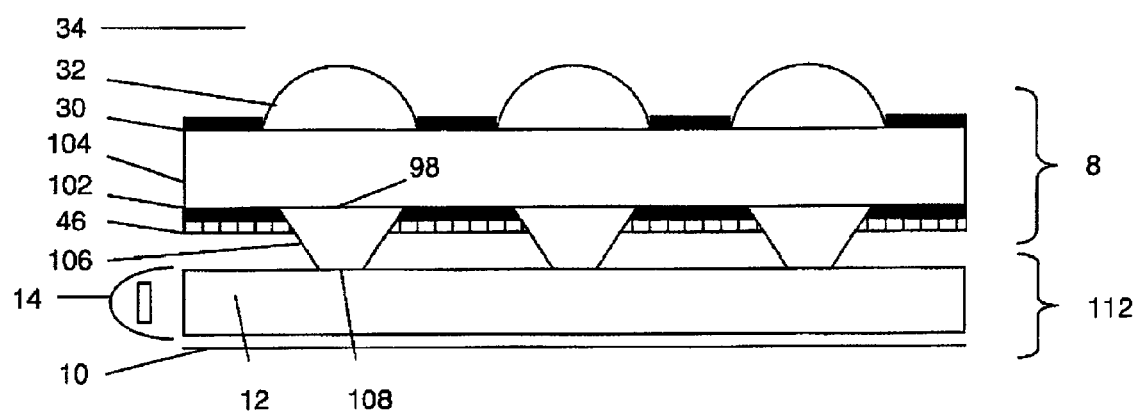
FIG. 25 is a cross-sectional diagram illustrating a parallax optic and an illuminator constituting an illumination system of a further embodiment of the present invention.

The array of optical elements, 106, may be of many different shapes. One alternative is shown in FIG. 25, in which the optical elements have a cross-section of truncated pyramids. In this case the shortest of the parallel sides of the trapezium is in contact with the light guide.

Embodiment 16

FIG. 26 shows another example of backlight outcoupling features that may be aligned with the microlenses, 32. The design works in a similar way to that of FIG. 25, however the outcoupling features, 110, are reflective strips that reflect light travelling down the waveguide up towards the microlenses, 32. This helps the efficiency of the design because light is only emitted behind the apertures, 98. Apertures, 102, and reflective regions, 46, might be omitted in this design.

In principle, the illuminator 112 of FIG. 26 may in some applications be used without the parallax optic 8, since the illuminator 112 will emit substantially collimated light. The parallax optic will, if present, block the small amount of light emitted by the illuminator in undesired directions.

Embodiments 13 to 16 may be modified to operate in a 2-dimensional sense such that the angular spread of light is restricted in both a vertical and horizontal direction. (The terms "vertical" and "horizontal" refer to the display as it is seen by the observer.) This may be achieved by making the microlens, 32, and apertures, 98, to be spherical, square or rectangular. It may be desirable to have a different viewing angle range horizontally to that vertically. For example, where a display is to be used in a motor vehicle it may be desired for light to be essentially collimated in the vertical direction (ie to be emitted in a very narrow viewing angle range in the vertical direction, to prevent light from being reflected off the windscreen as described above), but for light to be emitted in a wider range of viewing angles in the horizontal direction to ensure that the display is clearly visible to both front seat occupants of the vehicle or even to both front and rear seat occupants. This can be achieved by making the lenses and apertures elongate in one particular direction.

If embodiments 13 and 14 were modified in this way, the lenses and apertures would appear in plan view as shown in FIGS. 17 and 18 for circular and square lenses respectively. This arrangement would lead to a wider viewing angle in the horizontal direction than the vertical direction. For embodiments 15 and 16 the optical elements, 106, would adopt the same shape as the aperture, 98, at surface where the optical elements intersect with the aperture.

Figure 28:
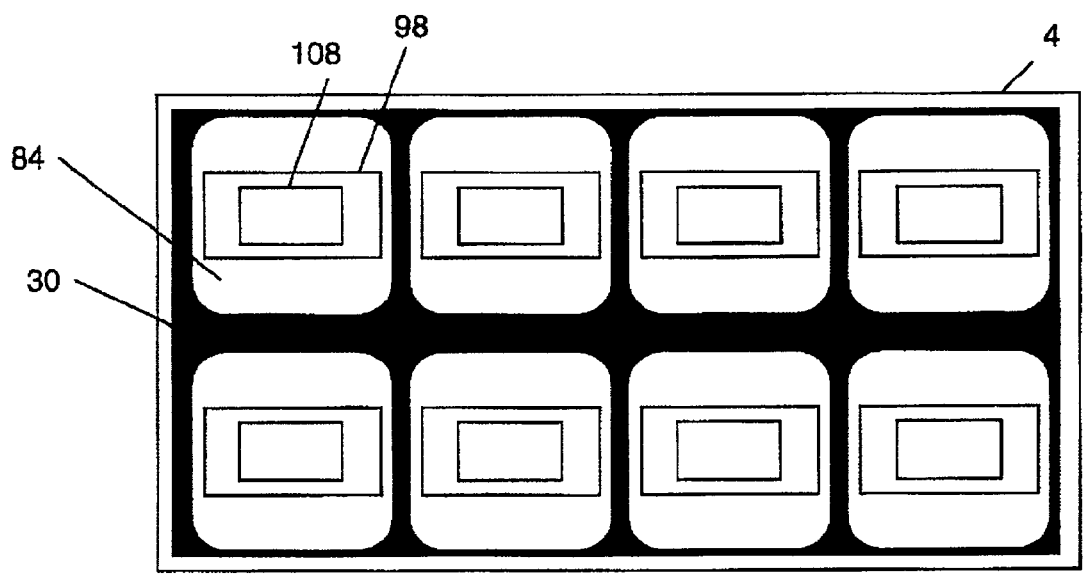
FIG. 28 is a plan view illustrating an illumination system of a further embodiment of the present invention.

In embodiment 15 illustrated in FIG. 25 it is possible to generate a different horizontal angle range by controlling the shape of the truncated pyramid such that the slope of the sides of the pyramid are different in a horizontal direction to the vertical direction. This is illustrated schematically in FIG. 28 which shows the parallax optic in plan view, showing the top, 98, and lower, 108, surfaces of the truncated pyramid. The microlenses may take any shape as described hereinbefore.

Figure 29:
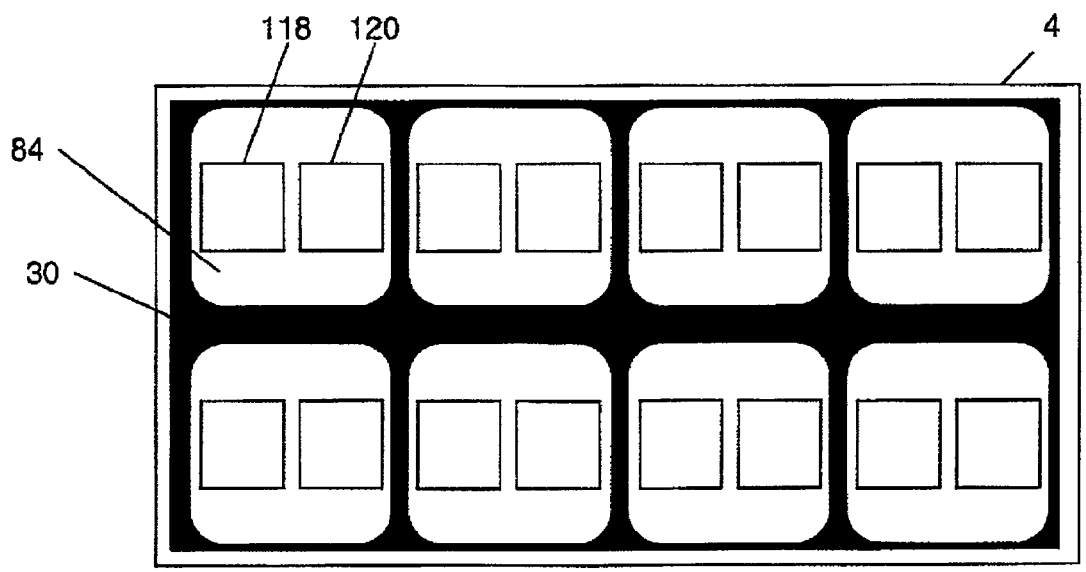
FIG. 29 is a plan view illustrating an illumination system of a further embodiment of the present invention.

If a display is to be used as the centre console display in a car it is desirable to have as much of the light as possible directed towards the driver and co-driver, whilst still preventing light from hitting the windscreen in a vertical direction. For a typical car the direction from a driver or co-driver to a display makes an angle of approximately ±30° with the normal to the display (with an angle of −30° being on the opposite side of the display normal to an angle of +30°) so any light emitted by the display that is not either within a viewing angle range, in the horizontal direction, centred on an angle of −30° or within a viewing angle range, in the horizontal direction, centred on an angle of +30° is usually wasted (as it does not reach the driver or co-driver). Therefore, if the light can be limited to two horizontal angular ranges centred respectively around +/−30° there is a distinct advantage in display viewability or power consumption. Making each angular range extend over approximately ±20° from its centre (ie approximately from −50° to −10° and approximately from +10° to +50°) should ensure that the driver and co-driver are each positioned within their respective viewing window, and allow for differently-sized and differently-positioned drivers and co-drivers (although the invention is not limited to angular ranges that extend over approximately ±20° from their centre and, indeed, it is possible that the two angular ranges overlap one-another). This may be achieved in the same way as described in FIG. 19, in which 2 sub-microlenses, 86 and 88 image a single aperture, 40, to 2 different directions, 90 and 92 as shown in FIG. 20. In this case, one example in plan view is shown in FIG. 19. An alternative is shown in FIG. 29 in which a single microlens, 84, images two apertures, 118 and 120 to two different horizontal directions.

A further embodiment is shown in FIGS. 30(*a*) and 30(*b*) which comprises a backlight light with extraction features whose shape is designed such that it restricts the angular spread of light by collimating light in the vertical direction (i.e. away from the windscreen), and directs light to the driver and co-driver (in the horizontal direction). The figure shows the shape as an almost cone shaped structure 122, with contact point on the waveguide 12, labelled 124. Light from the contact point will be manipulated by the structure to the driver and passenger and away from the windscreen as shown by the arrows, 126, 128.

Embodiment 17

An alternative way of producing an illuminator with a restricted angular light output range is shown in FIG. 27. A light source 14, can be in coupled into a waveguide 12. The light propagates along the waveguide until it reaches out coupling prisms. These prisms are elongated prisms with reflective outer surfaces 116 and 114. The angles of these prisms are optimised such that they reflect the light propagating along the waveguide out the front face of the waveguide (top surface in the diagram). The angles of the prisms can be adjusted so that nearly all the light is emitted within a narrow cone of angles. For example, where the illuminator is for use in a motor vehicle it may be desired that light emitted by the illuminator is substantially collimated in the vertical direction and is in two viewing angle ranges, one centred on an angle of approximately −30° and one centred on an angle of approximately +30°, in the horizontal direction. Reflective film 10 is optional, but as in a conventional waveguide backlight illuminator, it reflects light that is scattered out of the lower surface of the waveguide back towards the display.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. A display comprising: a single-view image display panel; and a parallax optic disposed over a display face of the image display panel for restricting an angular spread of light output from the display face of the image display panel;
    wherein the display panel is a pixelated display panel and wherein an element of the parallax optic is associated with no more than one pixel of the display panel or with no more than one line of pixels of the display panel,
    the elements of the parallax optic restrict the angular spread of light output from the display face of the image display panel in two orthogonal directions,
    the elements of the parallax optic substantially collimates light output from the display face of the image display panel in a first of the orthogonal directions, and
    the elements of the parallax optic restrict the angular spread of light output from the display face of the image display panel in a second of the orthogonal directions into a first angular range centered on an angle of approximately −30° with respect to a normal to the display and a second angular range centered on an angle of approximately +30° with respect to the normal.

2. A display as claimed in claim 1 wherein a pitch of elements of the parallax optic is equal to the pitch of pixels of the display.

3. A display as claimed in claim 2 wherein each element of the parallax optic is offset with respect to an associated pixel of the display, in a direction parallel to the display face of the display.

4. A display as claimed in claim 1 wherein a pitch of elements of the parallax optic is less than the pitch of pixels of the display.

5. A display as claimed in claim 1 wherein a pitch of elements of the parallax optic is greater than the pitch of pixels of the display.

6. A display as claimed in claim 1 wherein a pitch of elements of the parallax optic is constant across the display.

7. A display as claimed in claim 1 wherein a pitch of elements of the parallax optic is not constant across the display.

8. A display as claimed in claim 1 wherein the parallax optic is a microlens array.

9. A display as claimed in claim 8 and wherein a spacing between the microlens array and the pixels of the image display panel is approximately equal to a focal length of the microlens array.

10. A display as claimed in claim 8 wherein the microlens array is integral with the display face of the image display panel.

11. A display as claimed in claim 8 and comprising a layer of material having a refractive index lower than the refractive index of the microlens array, the layer of material being disposed directly adjacent to the microlens array.

12. A display as claimed in claim 8 wherein the microlens array is spaced from the image display panel by material having a refractive index lower than the refractive index of the microlens array.

13. A display as claimed in claim 8 and wherein the parallax optic comprises light-absorbing material provided between lenses of the microlens array.

14. A display as claimed in claim 8 wherein the lenses are selected from the group consisting of cylindrical lenses, spherical lenses, rectangular lenses and square lenses.

15. A display as claimed in claim 8 wherein the lenses are plano-convex lenses.

16. A display as claimed in claim 8 wherein the lenses are bi-convex lenses.

17. A display as claimed in claim 1 wherein the elements of the parallax optic restrict the angular spread of light output from the display face of the image display panel in one direction.

18. A display as claimed in claim 1 and comprising a reflective material provided behind non-transmissive portions of the image display panel.

19. A display as claimed in claim 8 wherein the microlens array comprises an array of cylindrical lenses, each lens associated with a line of pixels.

20. A display as claimed in claim 1 where the image display panel is an emissive image display panel.

21. A display as claimed in claim 1 where the image display panel is a non-emissive image display panel.

22. A display as claimed in claim 21 wherein the image display panel is a liquid crystal display panel.

23. A display as claimed in claim 1 and for use in a motor vehicle.

24. A display as claimed in claim 1 and for use in an aircraft.

25. A parallax optic comprising: an aperture array; a microlens array for restricting an angular spread of light transmitted through the aperture array; non-light transmissive material disposed between microlenses of the microlens array; and a layer of material having lower refractive index than the microlens array, the layer of material being disposed directly adjacent to the microlens array,
wherein light transmitted through the aperture array passes through the layer of material having the lower refractive index.

26. A parallax optic as claimed in claim 25 wherein the aperture array is disposed on a first face of a substrate and the microlens array is disposed on a second face of the substrate, the first face being opposed to the second face.

27. A parallax optic as claimed in claim 25 wherein the aperture array is disposed on a first substrate and the microlens array is disposed on a second substrate, the first substrate being opposed to the second substrate.

28. A parallax optic as claimed in claim 25 and comprising reflective material disposed between the apertures of the aperture array for reflecting light incident on non-aperture portions of the aperture array.

29. A parallax optic as claimed in claim 25 and comprising an array of optical elements, the optical elements being disposed in respective apertures of the aperture array.

30. A parallax optic as claimed in claim 29 and wherein the array of optical elements comprises a second array of microlens.

31. A parallax optic as claimed in claim 25 and adapted to restrict in two orthogonal directions the angular spread of light transmitted through the aperture array.

32. A parallax optic as claimed in claim 31 and adapted to substantially collimate light in a first of the orthogonal directions.

33. A parallax optic as claimed in claim 32 and adapted to restrict the angular spread of light in a second of the orthogonal directions into a first angular range centred on an angle of approximately −30° with respect to a normal to the parallax optic and a second angular range centred on an angle of approximately +30° with respect to the normal.

34. An illumination system comprising: (a) an illumination panel comprising: at least one light source; a lightguide having first and second facing major surfaces, the first of which comprises an output surface for light, and a minor edge surface through which the at least one light source is arranged to introduce light into the lightguide; and (b) a parallax optic as defined in claim 28 disposed over the output surface of the lightguide.

35. An illumination system as claimed in claim 34 wherein the parallax optic comprises an array of optical elements, the optical elements being disposed in respective apertures of the aperture array; and wherein the optical elements make contact with the output surface of the lightguide thereby to provide light outcoupling points.

36. A parallax optic comprising: an aperture array; a microlens array for restricting an angular spread of light transmitted through the aperture array; non-light transmissive material disposed between microlenses of the microlens array; and a layer of material having lower refractive index than the microlens array, the layer of material being disposed directly adjacent to the microlens array,
wherein the parallax optic is adapted to restrict in two orthogonal directions the angular spread of light transmitted through the aperture array,
the parallax optic is adapted to substantially collimate light in a first of the orthogonal directions, and
the parallax optic is adapted to restrict the angular spread of light in a second of the orthogonal directions into a first angular range centered on an angle of approximately −30° with respect to a normal to the parallax optic and a second angular range centered on an angle of approximately +30° with respect to the normal.

* * * * *